United States Patent
Famaey et al.

(10) Patent No.: US 10,523,723 B2
(45) Date of Patent: Dec. 31, 2019

(54) METHOD, SYSTEM AND VARIOUS COMPONENTS OF SUCH A SYSTEM FOR SELECTING A CHUNK IDENTIFIER

(71) Applicants: Koninklijke KPN N.V., Rotterdam (NL); IMEC VZW, Leuven (BE); Universiteit Gent, Ghent (BE)

(72) Inventors: Jeroen Maurice Margaretha Famaey, Ghent (BE); Steven Bert Latré, Lokeren (BE)

(73) Assignees: KONINKLIJKE KPN N.V., Rotterdam (NL); IMEC VZW, Leuven (BE); UNIVERSITEIT GENT, Ghent (BE)

( * ) Notice: Subject to any disclaimer, the term of this patent is extended or adjusted under 35 U.S.C. 154(b) by 138 days.

(21) Appl. No.: 14/725,649

(22) Filed: May 29, 2015

(65) Prior Publication Data

US 2015/0358373 A1    Dec. 10, 2015

(30) Foreign Application Priority Data

Jun. 6, 2014    (EP) .................................. 14171459

(51) Int. Cl.
*G06F 15/16*     (2006.01)
*H04L 29/06*     (2006.01)
(Continued)

(52) U.S. Cl.
CPC ...... *H04L 65/4069* (2013.01); *H04L 65/4084* (2013.01); *H04L 65/601* (2013.01);
(Continued)

(58) Field of Classification Search
CPC ............. H04L 65/4069; H04L 65/4084; H04L 65/601; H04L 65/608; H04L 67/02;
(Continued)

(56) References Cited

U.S. PATENT DOCUMENTS 6,553,376 B1    4/2003  Lewis et al.
7,289,519 B1    10/2007 Liskov
(Continued)

FOREIGN PATENT DOCUMENTS

EP    2 116 939       11/2009
EP    2 131 362 A1    12/2009
(Continued)

OTHER PUBLICATIONS

Extended European Search Report for EP Application No. 15170691.8, dated Nov. 5, 2015.

(Continued)

*Primary Examiner* — Normin Abedin
(74) *Attorney, Agent, or Firm* — Hamilton, Brook, Smith & Reynolds, P.C.

(57) ABSTRACT

The invention relates to a method, a system and various components of such a system for selecting a chunk identifier in a content delivery network. In said network a first and a second chunk are available, belonging to different quality representations of a content item. A client device transmits a first chunk retrieval request for retrieving a first chunk and a further request. In response to said first chunk retrieval request and/or said further request, delivery path information is transmitted. The delivery path information may comprise chunk identifiers and bandwidth indicators. On the basis of the delivery path information the client device determines a chunk identifier to be included in a second chunk retrieval request for retrieving a second chunk.

15 Claims, 5 Drawing Sheets

(51) Int. Cl.
  *H04L 29/08* (2006.01)
  *H04N 21/262* (2011.01)
  *H04N 21/442* (2011.01)
  *H04N 21/462* (2011.01)
  *H04N 21/63* (2011.01)
  *H04N 21/845* (2011.01)

(52) U.S. Cl.
  CPC ............ *H04L 65/608* (2013.01); *H04L 67/02* (2013.01); *H04L 67/06* (2013.01); *H04L 69/14* (2013.01); *H04N 21/26258* (2013.01); *H04N 21/44209* (2013.01); *H04N 21/4621* (2013.01); *H04N 21/4622* (2013.01); *H04N 21/631* (2013.01); *H04N 21/8456* (2013.01)

(58) Field of Classification Search
  CPC ... H04L 67/06; H04L 69/14; H04N 21/26258; H04N 21/44209; H04N 21/4621; H04N 21/4622; H04N 21/631; H04N 21/8456
  USPC .......................................................... 709/231
  See application file for complete search history.

(56) References Cited

U.S. PATENT DOCUMENTS

| | | | |
|---|---|---|---|
| 9,143,543 | B2 | 9/2015 | Falvo |
| 9,271,021 | B2 | 2/2016 | Adimatyam |
| 9,380,092 | B2 | 6/2016 | Patel |
| 9,614,579 | B2 | 5/2017 | Gouache |
| 9,826,016 | B2 | 11/2017 | Petrangali et al. |
| 10,171,528 | B2 | 1/2019 | Wissingh et al. |
| 10,225,306 | B2 | 3/2019 | van Deventer et al. |
| 2003/0097443 | A1 | 5/2003 | Gillet |
| 2003/0142670 | A1 | 7/2003 | Gould et al. |
| 2004/0010613 | A1 | 1/2004 | Apostolopolous et al. |
| 2004/0049579 | A1 | 3/2004 | Ims |
| 2004/0078293 | A1 | 4/2004 | Iverson et al. |
| 2004/0162787 | A1 | 8/2004 | Madison |
| 2005/0071881 | A1 | 3/2005 | Deshpande |
| 2005/0265345 | A1 | 12/2005 | Chen et al. |
| 2007/0038873 | A1 | 2/2007 | Oliveira |
| 2007/0242666 | A1 | 10/2007 | Barrett |
| 2008/0189429 | A1 | 8/2008 | DaCosta |
| 2009/0094322 | A1 | 4/2009 | Uno et al. |
| 2009/0113024 | A1 | 4/2009 | Verma |
| 2009/0292819 | A1 | 11/2009 | Kandekar et al. |
| 2009/0313330 | A1 | 12/2009 | Sakamoto |
| 2010/0011061 | A1 | 1/2010 | Hudson |
| 2010/0161756 | A1 | 6/2010 | Lewis et al. |
| 2010/0169458 | A1 | 7/2010 | Biderman et al. |
| 2010/0226372 | A1 | 9/2010 | Watanabe |
| 2010/0241757 | A1 | 9/2010 | Hu et al. |
| 2010/0299443 | A1 | 11/2010 | Hu et al. |
| 2011/0066673 | A1 | 3/2011 | Outlaw |
| 2011/0082924 | A1 | 4/2011 | Gopalakrishnan |
| 2011/0145303 | A1 | 6/2011 | Boldyrev |
| 2011/0225371 | A1 | 9/2011 | Spry |
| 2011/0231519 | A1* | 9/2011 | Luby ................ H04N 21/23106 709/219 |
| 2011/0314130 | A1 | 12/2011 | Strasman |
| 2012/0082158 | A1 | 4/2012 | Reddy |
| 2012/0090036 | A1 | 4/2012 | Kang et al. |
| 2012/0124179 | A1 | 5/2012 | Cappio |
| 2012/0233247 | A1 | 9/2012 | Ashrafi |
| 2012/0254591 | A1 | 10/2012 | Hughes et al. |
| 2012/0265856 | A1 | 10/2012 | Major et al. |
| 2012/0278495 | A1 | 11/2012 | Furbeck |
| 2012/0290644 | A1 | 11/2012 | Gabin et al. |
| 2012/0307280 | A1 | 12/2012 | Ishihara |
| 2013/0013803 | A1 | 1/2013 | Bichot |
| 2013/0054728 | A1 | 2/2013 | Amir et al. |
| 2013/0095806 | A1 | 4/2013 | Salkintzis et al. |
| 2013/0097309 | A1 | 4/2013 | Ma et al. |
| 2013/0132605 | A1 | 5/2013 | Kocks et al. |
| 2013/0166868 | A1 | 6/2013 | Jarnikov et al. |
| 2013/0166906 | A1 | 6/2013 | Swaminathan |
| 2013/0191511 | A1 | 7/2013 | Liu et al. |
| 2013/0275557 | A1* | 10/2013 | Myers ................ H04N 21/2221 709/219 |
| 2013/0276009 | A1 | 10/2013 | Ajitomi et al. |
| 2013/0304848 | A1 | 11/2013 | Lyle et al. |
| 2013/0346590 | A1 | 12/2013 | Scurtu et al. |
| 2014/0089467 | A1 | 3/2014 | Beck et al. |
| 2014/0095670 | A1 | 4/2014 | Ozgur |
| 2014/0156948 | A1 | 6/2014 | Roberts |
| 2014/0244828 | A1 | 8/2014 | Besehanic |
| 2014/0245359 | A1 | 8/2014 | De Foy |
| 2014/0269497 | A1 | 9/2014 | Jain et al. |
| 2014/0304377 | A1 | 10/2014 | Andersson et al. |
| 2014/0359081 | A1 | 12/2014 | Van Deventer |
| 2015/0195243 | A1 | 7/2015 | Roskind |
| 2015/0207846 | A1 | 7/2015 | Famaey et al. |
| 2016/0149978 | A1 | 5/2016 | Wissingh et al. |
| 2016/0198202 | A1 | 7/2016 | Van Brandenburg et al. |
| 2016/0248835 | A1 | 8/2016 | Petrangali et al. |
| 2016/0337902 | A1 | 11/2016 | Hahn |
| 2017/0171287 | A1 | 6/2017 | Famaey et al. |
| 2019/0089756 | A1 | 3/2019 | Wissingh et al. |
| 2019/0149589 | A1 | 5/2019 | van Deventer et al. |

FOREIGN PATENT DOCUMENTS

| | | |
|---|---|---|
| EP | 2 360 923 A1 | 8/2011 |
| EP | 2 587 824 A1 | 1/2013 |
| EP | 2 605 469 A1 | 6/2013 |
| EP | 2 723 033 A1 | 4/2014 |
| GB | 2472985 A | 3/2011 |
| JP | 2011-53244 | 2/1999 |
| JP | H1153244 | 2/1999 |
| JP | 2001101061 | 4/2001 |
| JP | 2004-310593 | 11/2004 |
| JP | 2006-171822 | 6/2006 |
| JP | 2009-157694 | 7/2009 |
| JP | 2009-187466 | 8/2009 |
| JP | 2014/017741 | 1/2014 |
| WO | 2002/044905 | 6/2002 |
| WO | WO 2009/075033 | 6/2009 |
| WO | WO 2009/095078 | 8/2009 |
| WO | 2011/038032 A2 | 3/2011 |
| WO | WO 2011/026887 | 3/2011 |
| WO | WO 2011/047335 | 4/2011 |
| WO | WO 2011/127312 | 4/2011 |
| WO | WO 2011/059286 A3 | 5/2011 |
| WO | WO 2011/066691 | 6/2011 |
| WO | 2011/087449 A1 | 7/2011 |
| WO | WO 2011/101371 A1 | 8/2011 |
| WO | 2012/010714 A1 | 1/2012 |
| WO | WO 2012/107341 | 8/2012 |
| WO | WO 2012/123773 A1 | 9/2012 |
| WO | 2012/138895 | 10/2012 |
| WO | WO 2012/178174 | 12/2012 |
| WO | 2013/098317 | 7/2013 |
| WO | WO 2013/098319 A1 | 7/2013 |
| WO | WO 2013/107502 A1 | 7/2013 |
| WO | WO 2014/023330 A1 | 2/2014 |
| WO | WO 2014/090761 | 6/2014 |
| WO | WO 2015/000936 | 1/2015 |
| WO | WO 2015/121342 | 8/2015 |

OTHER PUBLICATIONS

Akhshabi, Saamer, et al., "What Happens When HTTP Adaptive Streaming Players Compete for Bandwidth," NOSSDAV 12, 6 pgs., Jun. 7-8, 2012.

Claeys, et al., "Design of a Q-Learning Based Client Quality Selection Algorithm for HTTP Adaptive Streaming," Proceedings of the Adaptive and Learning Agents Workshop, part of AAMAS 2013, May 2013.

Petrangeli, Stefano, et al., "A Multi-Agent Q-Learning-based Framework for Achieving Fairness in HTTP Adaptive Streaming," IEEE, Network Operations and Management Symposium (NOMS), 9 pgs., May 5-9, 2014.

(56) References Cited

OTHER PUBLICATIONS

Jiang, Junchen, et al., "Improving Fairness, Efficiency, and Stability in HTTP-Based Adaptive Video Streaming With Festive," IEEE, ACM Transactions on Networking, vol. 22, No. 1, pp. 326-340, Feb. 2014.
Adobe, "HTTP Dynamic Streaming," May 25, 2013, 2 pages, http://wwwimages.adobe.com/www.adobe.com/content/ dam/ Adobe/ en/products/hds-d yna m ic-strea m ing/pdfs/hds datasheet. Pdf.
Cohen, E. and Kaplan, H., "Prefetching the Means for Document Transfer: A New Approach for Reducing Web Latency," Computer Networks, 39(4): 437-455 (2002).
DNS Reviews, "DNS Comparison," Dec. 18, 2012, 24 pages, https://web.archive.org/web/20131218212046/http:I/ www.dnsreviews.com/dns-comparison/.
Francis, P., S. Jamin, J. Cheng, Y. Jin, D. Raz, Y. Shavitt, and L. Zhang, "IDMaps: A global Internet host distance estimation service," IEEE/ACM Transactions on Networking, 9(5), pp. 525-540, 2001.
Google code, "Minimize round-trip times," Mar. 14, 2012 (last updated Jan. 9, 2018), 5 pages, https://web.archive.org/web/20120314000842/ http:// code_google.com/speed/page-speed/docs/ rtt .html.
GTmetrix, "Page Speed: Minimize Redirects," May 31, 2012, 5 pages, https://web.archive.org/web/20120531001856/ http://gtmetrix.com/minimize-redirects.html.
Gummadi, K. P., S. Saroiu, and S. D. Gribble, "King: Estimating latency between arbitrary Internet end hosts," 2nd ACM SIGCOMM Workshop on Internet measurement, pp. 5-18, 2002.
Hartung, Frank, et al., "DRM Protected Dynamic Adaptive HTTP Streaming," MMSys '11, pp. 277-282, Feb. 23-25, 2011.
http://blog.chromium.org/2008/09/dns-prefetching-or-pre-resolving.html, The Chromium Blog, DNS Prefetehing (or Pre-Resolving) (Sep. 17, 2008).
http://blogs.msdn.com/b/ie/archive/2011 /03/17 /internet-explorer-9-network-performance-improvements.aspx, I EBlog (Mar. 17, 2011).
http://stackoverflow.com/questions/3778347/is-it-ok-to-http-redirect-images. Questions tab (Sep. 23, 2010).
Information technology—Dynamic adaptive streaming over HTTP (DASH)—Part 1: Media presentation description and segment formats, ISO/IEC 23009-1, Apr. 1, 2012, 134 pages.
Information technology—MPEG systems technologies—Part 6: Dynamic adaptive streaming over HTTP (DASH), ISO/IEC JTC, ISO/IEC FCD 23001-6, Jan. 28, 2011, 86 pages.
Lee, Jin Young et al., Dynamic Adaptive Streaming Over HTTP (DASH) EE#1-CMP Participants, International Organisation for Standardisation Organisation Internationale De Normalisation, ISO/IEC JTC1/SC29/WG11, Oct. 2010.
Liu, "Client-Driven Joint Cache Management and Rate Adaptation for Dynamic Adaptive Streaming over HTTP," Jan. 3, 2013.
Ma, Kevin J. and Bartos, Radim, "DRM Workflow Analysis for Over-The-Top HTTP Segmented Delivery," IEEE, 2011.
Mavlankar, et al., "An interactive region-of-interest video streaming system for online lecture viewing," 18th International In Packet Video Workshop (PV), IEEE, pp. 64-71 (2010).
Microsoft, "Smooth Streaming: The Official Microsoft IIS Site," Dec. 19, 2012, 2 pages, http://www.iis.net/downloads/microsoft/sm oath-streaming.
Network Performance, DNS Response Times, Jan. 2, 2012, 7 pages, http://www.plus.net/support/service/network_performance/dns_response_times.shtml.
Ng, E. and H. Zhang, "Predicting Internet network distance with coordinates-based approaches," IEEE INFOCOM, 2002.
Pantos et al., "HTTP Live Streaming draft-pantos-http-live-streaming-07," Sep. 30, 2011, 33 pages.
Pantos, R. and May, W., "HTTP Live Streaming," draft-pantos-http-live-streaming-08, Apple, Inc., server date Mar. 26, 2012; downloaded by EPO on Mar. 27, 2012, Mar. 23, 2012.
Peterson, "A Simple Approach to CDN Interconnection," http://tools.ietf.org/html/draft-peterson-cdni-strawman-OO, A Simple Approach to CON Interconnection draft-peterson-cdni-strawman-00 (Apr. 19, 2011).
Prasad, R., C. Dovrolis, M. Murray, and K. Claffy, "Bandwidth estimation: metrics, measurement techniques, and tools," IEEE Network, 17(6), pp. 27-35, 2003.
RequestPolicy, "What is Prefetching?" Mar. 2, 2010, 1 page, https://web.archive.org/web/20100302173012/http:// www.requestpolicy.com/help/prefetch.
Singer, David, "On HTTP Streaming," TSG-SA4#60 meeting, Tdoc S4 (10)0610, Aug. 2010.
Sodagar, Iraj, "The MPEG-DASH Standard for Multimedia Streaming Over the Internet," Industry and Standards, IEEE Computer Society, pp. 62-67, Oct.-Dec. 2011.
Stockhammer, et al., "Dynamic Adaptive Streaming over HTTP (DASH) MPEG," International Organization for Standardization, ISO/IEC JTC1/SC 29, MPEG/M18620 (Oct. 2010) Guangzhou, China.
Stockhammer, T., "Technologies under Consideration for Dynamic Adaptive Streaming over HTTP 23009, parts 1 and 4", International Organization for Standardisation, ISO/IEC JTC1/SC29/WG11 MPEG2011/N12887, Coding of Moving Pictures and Audio (Jul. 2012) Stockholm, Sweden.
Stockhammer, T., et al., "Next segment signaling through HTTP GET extension for CDNs", International Organization for Standardisation, ISO/IEC JTC1/SC29/WG11, MPEG2010/M252986 Coding of Moving Pictures and Audio (Jul. 2012) Stockholm, Sweden.
Su, et al., "Drafting Behind Akamai {travelocity-based detouring)," ACM SIGCOMM Computer Communication Review 36.4, 2006, pp. 435-446.
Title Unknown, http://www.limelightnetworks.com/2011/02/appnoteandroidapps/ (Applicant last attempted to access this webpage on Jul. 16, 2014, but the site would not load; Applicant does not have a printout of the webpage).
Van Brandenburg, R., et al., "Models for Adaptive-Streaming-Aware CDN Interconnection," draft-brandenburg-cdni-has-02, server date Jun. 26, 2012; downloaded by EPO on Jun. 29, 2012, Jun. 27, 2012.
Whitepaper Manual (2010).
Wikipedia Foundation, "HTTP cookie", Jun. 28, 2013, available via the Internet at en.wikipedia.org/w/index.php? title=HTTP cookie &oldid=561910611 (last visited Jun. 26, 2018).
Zhanikeev, M., et al., "Building a Media Player in Browser using HTML5 WebWorkers," Proceedings of the 2012 Engineering Sciences Society Conference of IEICE 2, Institute of Electronics, Information and Communication Engineers, Aug. 28, 2012, pp. S-44 to S-45.
T. Stockhammer, "Dash in Mobile Networks and Services, and Visual Communications and Image Processing (VCIP)," 2012, IEEE, Nov. 27, 2012.
Huysegems, R., et al., "Session Reconstruction for HTTP Adaptive Streaming. Laying the Foundation for Network-Based QoE Monitoring," Bell-Labs, Alcatel-Lucent, *IEEE*, 9 pgs., 2012.
European Search Report, EP 14171459.2, dated Dec. 5, 2014.
Mueller, C., et al., "A Proxy Effect Analysis and Fair Adatpation Algorithm for Multiple Competing Dynamic Adaptive Streaming Over HTTP Clients," pp. 1-6, Visual Communications and Image Processing (VCIP) (Nov. 2012).
Bouten, N., et al., "QoE-driven in-network optimization for Adaptive Video Streaming Based on Packet Sampling Measurements," Computer Networks, 81: 96-115 (2015).
Stockhammer, T., Proposal, "CE-Sand: HTTP Communication Channel" MPEG Meeting, Motion Picture Expert Group or ISO/IEC JTC1/SC29/WG11, pp. 1-14 (Oct. 2014).
Van Der Hooft, J., et al., Parameters Self-Learning Optimization of Adaptive Video Streaming, Retrieved from the Internet: URL:http://buck.ugent.be.fulltxt.RUG01/002/153/683/rug01-002153683_2014_0001_AC.pdf (Oct. 2014).
Sniffen, "Practically Engageable Adversaries for Streaming Media," FAST, pp. 1-9 (2009).
3GPP TS 26.247, 3rd Generation Partnership Project; Technical Specification Group Services and System Aspects; Transparent

(56) References Cited

OTHER PUBLICATIONS end-to-end Packet-switched Streaming Service (PSS); Progressive Download and Dynamic Adaptive Streaming over HTTP (3GP-DASH), 3GPP Standard; 3GPP TS 26.247, 3rd Generation Partnership Project, vol. SA WG4, No. V12.1.0 (2013).

Lo Iacono, L., et al., "Web-native Video Live Streaming," The Second International Conference on Building and Exploring Web Based Environments, 14-19 (2014).

Oyman, O., et al., "Quality of Experience for HTTP Adaptive Streaming Services," QoE Management in Emerging Multimedia Services, IEEE Communications Magazine, pp. 20-27 (2012).

\* cited by examiner

METHOD, SYSTEM AND VARIOUS COMPONENTS OF SUCH A SYSTEM FOR SELECTING A CHUNK IDENTIFIER

RELATED APPLICATION

This application claims priority under 35 U.S.C. § 119 or 365 to European Application No. 14171459.2, filed Jun. 6, 2014. The entire teachings of the above application are incorporated herein by reference.

TECHNICAL FIELD

The invention relates to a method, a system and a various components of such a system for selecting a chunk identifier.

BACKGROUND

In many video streaming techniques files can be streamed in chunks over a network protocol, for example using the video streaming technique referred to as HTTP Adaptive Streaming (HAS).

A chunk may be understood as a fragment (stored as part of a larger file) or a segment (stored as separate files), which may be played-out by a client device. Chunks can have any duration, but are usually either 2 (e.g., Microsoft Smooth Streaming) or 10 (e.g., Apple HTTP Live Streaming) seconds each.

The content files or content items, in particular media files such as videos, may be available in multiple quality representations, each representation comprising a number of time-sequential chunks.

A characteristic of a chunk may be the quality of the representation it belongs to. For example, a quality of the representation of a video file may have a (play out or rendering) bit rate of 2 Mb/s or 4 Mb/s. When different chunks, belonging to representations with different qualities, are available in a content delivery network (CDN), a client device (e.g. a device comprising an adaptive streaming client) connected to that network, arranged to play out said chunk, may seamlessly adapt the quality of its play-out (for example of the video) by retrieving chunks belonging to representations with different qualities, based on current network and device conditions.

Alternatively, the client device may adjust the quality of its play-out during play-out of a chunk by stopping the play-out of the chunk and seamlessly starting play-out of a chunk belong to representation with a higher quality. This may for example be achieved using a protocol such as Apple HLS.

The client device may request a manifest file (also referred to as a Media Presentation Description (MPD)), which comprises information about chunks forming a content file (such as a video). This information may comprise chunk identifiers identifying specific chunks, the network locations of said chunks (for example in the form of a domain name, an URL or an IP address), the quality of the representation to which each chunk belongs, and/or a time-sequence number.

Multiple representations of a content file (e.g. a video) may thus be available in one or more networks in the form of chunks belonging to representations with different qualities. These chunks may be located (distributed) at different network locations or network elements (e.g. residing on content servers, delivery server and/or caches in the one or more networks).

It is furthermore feasible that more than one copy of a representation (set of chunks) or of a part of a representation (e.g. only certain chunks) may exist in these one or more networks. This may be due to for instance load balancing algorithms in a network (e.g. more popular content is requested more frequently and hence may be stored at more locations than unpopular content), or when for example different networks relate to different (access) technologies or are owned and/or managed by different parties.

Usually the network comprises network elements such as delivery servers, routers and/or caches. On a delivery server one or more chunks may be stored, while on a cache a copy of said chunks may be stored.

When a client device transmits a request to a delivery server for a specific chunk, the cache may intercept the request and check whether the requested chunk is locally stored. If the requested chunk is locally stored, the chunk is served, provided or delivered directly by the cache. If not, the request is forwarded by the cache to the next network element on the path towards the delivery server. Such a type of cache, also referred to as a transparent cache, is an example of a transparent network element. A transparent cache may be described as a computer system, or software within a computer system, that determines if a requested page or file (e.g. a chunk) has already been stored in memory or on its hard disk. If it has not, the request is sent upstream to its normal destination. More generally speaking, a transparent network element sits between the client and server and is invisible to either side. For reaching a transparent network element no special HTML code or DNS redirection (from a content source) is required. The next network element in the path may for example be another transparent network element (e.g. transparent cache) or may be the delivery server (sometimes also referred to as origin server) itself. A delivery server (or origin server) is an example of a non-transparent network element, if it is specifically addressed in the request made by the client. Another example may be a request routing function being hosted on a computer system. A transmission path between the client device and the delivery server (e.g. the route followed by a request from a client and/or by the response) may be called a delivery path. A delivery path may comprise overlapping caches with other delivery paths. Moreover, multiple delivery paths may exist from the client device towards the same server, e.g. through different access networks.

Rate adaption algorithms, used by client devices known in the art, may use an estimation of the available end-to-end bandwidth between the client and a delivery server to decide which chunks of which quality representation to download. Such estimation may be based on a measured download time of chunks and/or the state of a client-side buffer, and thus may provide an estimation of the bandwidth perceived by the client device during content retrieval.

These adaption algorithms may work well when all chunks are stored on or originate from a single location or at least on/from multiple locations with similar bandwidth conditions. In practice, multiple delivery paths to a client device, whereby these paths for instance originate from different locations will usually also lead to differences in perceived bandwidth by the client device. This may be caused by different (and varying) network circumstances on these delivery paths. For example the usage of a part of the network may vary, as well as the length of one path over the other, the processing power at the network elements in the delivery path, including the delivery servers and/or caches and so on. Moreover, when caches on the path towards a delivery server host a subset of available chunks, and where multiple delivery servers may host chunks with the same content, a single point of origin can no longer be assumed.

Thus, an estimation of the available bandwidth to a single destination may no longer be accurate for the rate adaptation algorithm.

In US2012/0265856 a method and a system for data streaming in a computer network is disclosed. In such a network a cache server may be configured to offer bit rate hint data to the client, which enables the client to execute decisions about its bit rate requests. The cache server may be configured to transmit information about current load conditions for a cache server, along with information related to upstream bandwidth parameters.

Accordingly, to US2012/0265856 a client may request a high-quality bit rate and when a cache server receives this request, it analyzes the current criteria affecting the file transfer. Upstream criteria are generally not visible to the client without use of the rate hint data. These criteria can be inclusive of any suitable network characteristic that can affect a bit rate decision such as upstream hits (i.e., requests for particular content), current cache status, upstream bandwidth, load conditions, etc.

However, when multiple delivery servers and/or caches host the same chunks and/or multiple delivery paths exist between a client device and a delivery server, the method and system described in US2012/0265856 may not provide sufficient information for the client device to select a chunk with the optimum quality representation.

For example, when the client device may retrieve chunks via two different delivery paths, only the caches in the default delivery path, which is actively used by the client device to request chunks from a delivery server, may intercept this communication and may thus provide information about network conditions upstream (or downstream) of such cache. Caches that are in the other delivery path, which is not used by the client, will not be able to intercept any communication and will therefore not provide any information, because they are unaware of the needs of the client device.

These situations may for example occur when a client device such as a smartphone is connected through a first access network (such as WLAN) to a (content delivery) network. The same smartphone may also be able (have the capabilities) to connect to and retrieve representations of the same content via a second access network (such as LTE). Since the client device is however not using this second delivery path for content retrieval, the network elements in this potential second path do not provide any information regarding the network circumstances in this second path. Since the first delivery path may be the sub-optimal available path with respect to certain content, the known prior art may not always optimally serve the client's needs.

SUMMARY

According to a first aspect, a method is provided for selecting a chunk identifier referencing a chunk associated with a content item, on the basis of a manifest file, said content item being provided in one or more representations, each representation comprising a plurality of time-sequential chunks, each chunk preferably being associated with a play-out time, said manifest file comprising at least a first set of chunk identifiers referencing chunks of a first representation, and a second set of chunk identifiers referencing chunks of a second representation; chunks of said first representation being retrievable by a client device via a first delivery path and chunks of said second representation preferably being retrievable by said client device via a second delivery path, said method comprising:

transmitting, preferably by said client device, and preferably over said first delivery path, on the basis of said manifest file, a first chunk retrieval request for retrieving a first chunk of said first representation, said request comprising a chunk identifier of said first set;

transmitting, preferably by said client device, preferably over said second delivery path, on the basis of said manifest file, a further request comprising a chunk identifier, preferably of said second set;

receiving, preferably by said client device, delivery path information in response to said further request or said first chunk retrieval request, said information associated with said first or second delivery path;

selecting, preferably by said client device, at least on the basis of said received delivery path information, a chunk identifier, preferably from either said first or second set, for including in a second chunk retrieval request for retrieving a second chunk.

The term content item may refer any information that is digitized. It may refer to audio and/or video information. The content item may be provided, available or embodied in multiple representations.

Examples of characteristics of a quality of a representation are the following: a bit rate of the video information, a bit rate of the audio information, and a presence of content enhancements, such as subtitles or any other non-video/non-audio information.

For example, the video information may be digitized having a certain bitrate, for example 2 Mb/s or 4 Mb/s. The audio information may be digitized with a specific bitrate.

The client device may be any kind of device, computer, server or part thereof that is capable of requesting content items and/or chunks and of processing said content items and/or chunks, for example by playing video and/or audio content. The client device may comprise an adaptive streaming client for this purpose.

In general, a device, such as the client device or a network element, may be embodied as one or more microprocessors or as a circuitry.

The client device may be connected to one or more networks or more in particular, to one or more content delivery networks. Such networks may comprise network elements, such as caches, content servers, etc.

The client device may be arranged for transmitting a first chunk retrieval request and/or a further request. The term "request" may refer to said first chunk retrieval request and/or to said further request. A request may be message with instructions to be processed by a network element. The request may be addressed, i.e. it contains information identifying a network element for which the message is intended. When the message is received by a network element, it may be processed by the network element.

The request may comprise a chunk identifier, referencing a chunk of a certain representation. In general, a chunk identifier may refer to a specific chunk in the content delivery network. The chunk identifier may comprise or may be provided with: information identifying the network element in which the chunk is stored, for example a URL (uniform resource locator); information relating to the quality representation to which the chunk belongs; and/or a time-sequence number.

A manifest file is a data file or data structure, comprising functional information (data) about available representations of one or more content items and the location of one or more chunks of these representations. Such a manifest file may be provided to the client device upon request. The manifest file may comprise one or more chunk identifiers.

According to the invention, the manifest file comprises at least a first and second set of chunk identifiers, referencing chunks of a first and a second representation respectively. Of course other suitable data structures than a manifest file type of data structure may be used to implement the invention.

The chunks of said first representation may be retrieved by the client device via a first delivery path. Said first delivery path is a route between the client device and a network element on which the chunks of the first representation are stored. The chunks of said second representation may be retrieved by the client device via a second delivery path or via said first delivery path. Said second delivery path is a route between the client device and a network element on which the chunks of the second representation are stored. The first and second delivery path may partly overlap.

According to the invention, said first chunk retrieval request is arranged for retrieving a first chunk of said first representation. Thus, the first chunk retrieval request may cause a network element to transmit a chunk. Which chunk is transmitted may be defined in the first chunk retrieval request itself.

On the other hand, said further request may be arranged for retrieving delivery path information. Thus, the further request may cause a network element to transmit delivery path information. The further request does not cause a network element to transmit a chunk. Therefore, the further request may be referred to as non-retrieving message, while said first chunk retrieval request may be referred to as retrieving message.

It may be the case that said first chunk retrieval request is further arranged for retrieving delivery path information, in addition to or alternatively to the further request being arranged for retrieving network information. In that case, it may not be necessary to transmit the further request.

The further request is preferably transmitted over the second delivery path, but may also be transmitted over the first delivery path. When transmitted over the first delivery path, the further request may comprise a chunk identifier of the first or second set. When transmitted over the second delivery path, the further request may comprise a chunk identifier of the second set.

The first representation may be different than or equal to the second representation. The second representation may be better/having a higher quality (e.g. a higher bitrate) than the first representation. It may also be the case that the second representation is worse or has a lower quality than the first representation.

The delivery path information may comprise information about which chunks are stored on which network element, in particular on which transparent network element, and/or information about the available bandwidth between such a network element and the client device. The delivery path information may comprise one or more chunk identifiers. When the delivery path information is provided by a certain network element, it may comprise information about the chunks stored on that certain network element and/or information about the available bandwidth between that certain network element and the client device.

Said delivery path information may be received in response to the further request and/or in response to the first chunk retrieval request. When received in response to the first chunk retrieval request or in response to a further request transmitted over the first delivery path, the delivery path information is associated with the first delivery path and/or may comprise a chunk identifier of the first or second set. When received in response to a further request transmitted over the second delivery path, the delivery path information is associated with the second delivery path and/or may comprise a chunk identifier of the second set.

According to the invention, the client device is arranged for transmitting said first chunk retrieval request. As a consequence of transmitting, the client device may receive a chunk, referenced by said chunk identifier of the first set and the client device may play out said chunk. As a consequence of the further request, the client device may receive delivery path information. Based on the network information, the client device may select a chunk identifier referencing a second chunk. In this way, the client device may select the second chunk. The second chunk may belong to the first representation or to the second representation.

The client device may be arranged for transmitting a second chunk retrieval request for retrieving the second chunk, referenced by the second chunk identifier. As a consequence of the second chunk retrieval request, the client device may receive the (selected) second chunk and may play out said second chunk.

The second chunk may be a chunk later in the time sequence to the content item than said first chunk. The second chunk may be transmitted later than said first chunk, may be received later by the client device than said first chunk, and/or be played later by the client device than said first chunk.

In general, chunks may be arranged with a time-sequence number. The second chunk may have a higher time-sequence number than said first chunk, in particular when said first chunk has a time-sequence number N, the second chunk may have a time-sequence number $Nf=N+1$, or have a time-sequence number $Nf=N+d$.

The number d may be determined by the client device based on the remaining play-out time of the first chunk, and/or an estimated download or retrieval time of the second chunk.

The further request may be transmitted over the second delivery path, which is at least partly different from the first delivery path, over which the first chunk retrieval request is transmitted. In this way, the further request may be received by network elements outside of the first delivery path. The difference may for example relate to the use of a different access network (technology) for each of the delivery paths. For example one delivery path uses Wi-Fi technology and the other LTE, WiMax or some other wireless technology, also combinations with fixed line access are feasible. Yet additionally the same access technologies may apply to each access network or delivery path, but they may be distinguished in another way, for example by being associated with different service providers (e.g. operators).

Since the delivery path information may now be received from network elements in and outside the delivery path that the client device is using for receiving chunks, the received delivery path information will provide more information, for example about which chunks are available and about the bandwidth available. Therefore, the selection of a second chunk identifier will be improved with respect to the prior art.

The further request may also be transmitted over the first delivery path, for example by the client device or a cache in the first delivery path. This may be advantageous when a cache (or any other transparent network element) in the first delivery path is serving the first chunk retrieval request. The network elements after this cache in the first delivery path will not receive the first chunk retrieval request and can therefore not transmit delivery path information in response to the first chunk retrieval request. In that case, the further request may be transmitted over the first delivery path and subsequently intercepted or received by the network elements after this cache. This further request may be transmitted by the client device or, in response to the first chunk retrieval request, by the cache serving the first chunk retrieval request.

According to an embodiment of the method according the invention, said first and/or said second chunk retrieval request comprises an HTTP GET request; and/or wherein said further request comprises an HTTP HEAD request; and/or wherein said delivery path information is embedded in an HTTP response message, preferably an HTTP 200 OK, an HTTP 30X Redirect or an HTTP 40X ERROR message.

An advantage of this embodiment is that the further request is transmitted using the same protocol as the first chunk retrieval request. A separate messaging system for transmitting further requests is therefore not needed. Furthermore, the delivery path information may be transmitted using the same protocol used for transmitting chunks. A separate messaging system for transmitting said delivery path information is therefore not needed.

According to an embodiment of the method according the invention, said first and second representation relate to different representations of said content item, in particular to representations having a different quality, and more particular to representation with a different rendering bitrate.

In this embodiment the client device may retrieve a chunk belonging to a representation of a different quality and thus may change the bitrate or quality of the play out of the content item.

According to an embodiment of the method according the invention, wherein a play-out time associated with said second chunk is earlier than, later than, or equal to a play-out associated with said first chunk.

Depending on the time required to retrieve or download the second chunk, it may be advantageous to select a second chunk with an associated play-out that is later than the play-out associated with the first chunk, such that the client device may change the quality of the rendering at the end of the rendering of the first chunk, when it starts rendering the next chunk.

When said time required to retrieve or download the second chunk is small, it may be advantageous to select a second chunk with an associated play-out that is equal to the play-out associated with the first chunk. In that case, the client device may stop the rendering of the first chunk and continue with the rendering of the second chunk.

According to an embodiment of the method according the invention, said further request is transmitted prior to said first chunk retrieval request.

According to an embodiment of the method according the invention, the client device is connected to a content delivery network, wherein said network comprises network elements. Said chunks belonging to the first or the second representation may be stored on one or more of said network elements. The network elements may comprise transparent network elements and non-transparent network elements, wherein said requests and said further request are addressed only to said non-transparent network elements. The delivery path information is preferably provided by transparent network elements.

A transparent network element may be arranged for receiving a first chunk retrieval request and/or said further request, being addressed to a non-transparent network element, and/or for processing said first chunk retrieval request and/or said further request, and/or for transmitting said first chunk retrieval request and/or further request to the non-transparent network element it is addressed to.

A cache may be a transparent network element, while a delivery server may be a non-transparent network element.

According to an embodiment of the method according the invention said second delivery path comprises at least a non-transparent network element and a transparent network element, said further request being addressed to said non-transparent network element, and said delivery path information preferably being provided by said transparent network element.

An advantage of this embodiment is that the client device receives delivery path information from transparent network elements in the second delivery path, in particular regarding the availability of chunks on these transparent network elements. The client device will not have received this information with the manifest file.

One or more network elements may be arranged for transmitting said delivery path information to the client device. When the delivery path information is transmitted to the client device by a transparent network element, e.g. a cache, the client device may interpret said delivery path information as coming from the non-transparent network element, e.g. a delivery server, wherein said transparent network element is in a delivery path between the client device and said non-transparent network element.

According to an embodiment of the method according the invention, the method further comprises determining a first bandwidth indicator indicating a first (available) bandwidth between a network element storing a chunk of the first representation and said client device.

According to an embodiment of the method according the invention, said delivery path information comprises a second bandwidth indicator indicating a second (available) bandwidth between a network element storing a chunk of the second representation and said client device.

According to an embodiment of the method according the invention, the selected chunk identifier, (i.e. the chunk identifier which was selected at least on the basis of said received delivery path information), references a chunk of said second representation, when:
said second representation has a higher quality than said first representation; and, optionally,
said second bandwidth enables the play-out of said chunk of said second representation.

In general, the (available) bandwidth between the client device and a network element storing a chunk, may enable the play-out (or rendering) of said chunk, when it enables retrieving or downloading (a part) of the chunk completely before the (part of) the chunk needs to be played out or rendering in order to provide a seamless play out or rendering of (at least a part of) the content item.

According to an embodiment of the method according the invention, the selected chunk identifier references a chunk of said second representation, when:
said second representation has a quality equal to, or lower than, the quality of said first representation;
said second bandwidth is larger than said first band-width; and, optionally,
said second bandwidth enables the play-out of said chunk of said second representation.

It may be advantageous to select a chunk belonging to a second representation with an equal or lower quality than first representation to which the first chunk belongs, when the available bandwidth for retrieving more chunks belonging to the first representation is insufficient or will be insufficient for a seamless play-out or rendering of the content item.

According to an embodiment of the method according the invention, said first and/or second chunk are retrievable from (network elements in) a content delivery network, said client device being connected to said content delivery network via a first access network and via a second access network and wherein said first delivery path is associated with the first access network and the second delivery path with the second access network.

The client device may be connected to one or more delivery servers via a first access network and via a second access network, different from the first access network, and wherein one of said first chunk retrieval request and said further requests is transmitted via the first access network and the other of said first chunk retrieval request and said further requests is transmitted via the second access network.

Especially when a client device is connected to the content delivery network using two different access technologies, such as wired and wireless access technologies or WLAN and 3G/4G access technologies, it may be advantageous to obtain information about the availability of chunks that are accessible using the access network that is currently not used for retrieving chunks.

According to an embodiment of the method according the invention, said delivery path information comprises at least one of:
 a chunk identifier, referencing a chunk of said second representation or said first representation;
 a bandwidth indicator, preferably indicating the (available) bandwidth between said client device and a network element storing said chunk;
 a chunk enhancement indicator, indicating chunks comprising content enhancements;
 a lifetime indicator, indicating a period the delivery path information is assumed to be valid.

In embodiments of the invention, the bandwidth indicator provides an indication of the average or maximum bandwidth available to the client device for retrieving one or more chunks via a given delivery path, preferably via the second delivery path. Understandably the bandwidth indicator may be based on historic measurements, ad-hoc measurements, or may be preconfigured. The measurements may be throughput measurements along any portion (e.g. node/network element) included in the, preferably second, delivery path, including the endpoints, such as the client device or the network element storing the chunk.

The chunk enhancement indicator may indicate that a chunk comprises subtitles, or other information relating to the video/audio that may be displayed or rendered during the play-out, such as a second screen.

The lifetime indicator may be used to determine when the next further request is to be transmitted. It may be advantageous to transmit the next further request after the lifetime of the provided delivery path information has lapsed.

According to an embodiment of the method according the invention, said manifest file and/or said client device comprises at least one of:
 a requesting flag, wherein said further request is only transmitted when said requesting flag is set;
 a requesting frequency, indicating a frequency for transmitting said further request;
 one or more buffer thresholds, wherein said further request is only transmitted when a buffer of said client device drops below said one or more buffer thresholds.

It may not be necessary to continuously transmit further requests. Moreover, transmitting too many further requests may cause congestion in the network. Therefore, further request may only be transmitted when a flag is set, or when the client is about to transmit a request for retrieving a second chunk (for example when its buffer is running empty, i.e. the buffer is below a certain buffer threshold).

According to an embodiment of the method according the invention, transmitting said further request and/or said first chunk retrieval request is triggered by a predefined event, the predefined event being for example a buffer of said client device being below a predefined buffer threshold.

According to an embodiment of the method according the invention, comprising transmitting said delivery path information in response to said further request, based on an indicator for allowing said transmission (of said delivery path information), wherein, preferably, said indicator is a cookie, preferably in a HTTP cookie header, or a token, preferably in an URL string.

Said further request may comprise said indicator or may be provided with said indicator.

According to another embodiment of the method according the invention, said delivery path information is only transmitted after verifying that said further request comprises or is provided with said indicator.

According to an embodiment of the method according the invention, the method further comprises identifying said client device as part of a predetermined list based on said token.

An indicator, or in particular a token, may be used to provide different services to different client devices. The indicator, in particular the token, may be provided to the client device by embedding it in the manifest file or by providing the manifest file with a so called cookie comprising the token.

Said delivery path information may only be transmitted when said further request comprises the indicator for allowing said transmission. Thus the delivery path information is only transmitted after it is verified, preferably by a network element, that the request comprises an indicator.

In another embodiment, the delivery path information may only be transmitted when said client device is part of a predetermined list. Whether the client device is part of said list (or is identified as part of said list) may be determined on the basis of said token.

In general, the manifest file may be received in response to transmitting a manifest file request. Said manifest file request may be transmitted based on a manifest file locator, referencing said manifest file. Instead of embedding the indicator, or in particular the token, in the manifest file, the indicator, or in particular the token, may also be provided with said manifest file locator.

According to an embodiment of the method according the invention, the method further comprises:
 transmitting a response to said first chunk retrieval request or said further request by one of the network elements, preferably a transparent network element, wherein said response preferably comprises delivery path information;
 adding delivery path information to said response by another one of the network elements, preferably another transparent network element.

It may be the case that a response from a network element comprising delivery path information is received by another network element, for example a non-transparent network element. This other network element may be arranged for providing delivery path information. This delivery path information from the other network element may be added to the response, which is then transmitted further towards the client device.

According to an embodiment of the method according the invention, the method further comprises transmitting said further request in response to said first chunk retrieval request, preferably over said first delivery path and preferably by a transparent network element.

It may be the case that the first chunk retrieval request does not reach a certain network element (e.g. a transparent network element or cache) in the first delivery path from the client device to the delivery server, when an earlier network device (e.g. a transparent network element or cache) in the first delivery path responds to the first chunk retrieval request by transmitting the first chunk to the client device. This may happen when the first chunk is stored on a first cache. As result, a second cache may not be trigger to transmit delivery path information.

Therefore, it may be advantageous to transmit a further request over the first delivery path to the delivery server. This further request may be transmitted by a network element, in particular a transparent network element or cache in response to (receiving or intercepting) said first chunk retrieval request.

According to a second aspect of the invention, a computer readable storage medium is provided, preferably non-transitory, with instructions, wherein the instructions are arranged for making one or more computers perform at least partly any one of the embodiments of the method according to the invention.

According to a third aspect of the invention, a computer program product is provided, comprising software code portions configured for, when run in the memory of a computer, executing the method steps of one of the embodiments of the method according to the invention.

According to a fourth aspect of the invention, a non-transitory computer readable storage medium is provided for storing at least part of a manifest file for use by a client device, preferably an embodiment of the client device according to the invention, said manifest file comprising:
one or more chunk identifiers for enabling said client device to generate a chunk retrieval request; and, optionally,
indicator information for adding an indicator to a request, preferably to said first chunk request or said further request, wherein said indicator information comprises an indicator for allowing transmission of delivery path information and/or an indicator instruction for instructing said client device to add said indicator to said request;
and, optionally:
an access network identifier associated with said one or more chunk identifiers, referencing chunks, and arranged for identifying an access network forming part of a delivery path via which said chunks are retrievable;
and, optionally:
a probe priority indicator associated with said one or more chunk identifiers and arranged for indicating an order of transmitting further request.

By including indicator information in the manifest file, it may be determined whether a client device is entitled to receive the delivery path information. In an embodiment, not the presence of the indicator (provided with or comprised by the further request or said first chunk request) but the content of the indicator may indicate that receiving network elements should or should not transmit delivery path information.

In general, an indicator may be a cookie, preferably in a HTTP cookie header, or a token, preferably in an URL string.

Another advantage of using an indicator, that is to be comprised in or provided with a request (a further request or a first chunk retrieval request), is that a network element having received said request, will only transmit delivery path information on the basis of the presence or content of said indicator. Therefore, the network element may not have to react in response to every request. This may reduce the processing load on the network element.

Since the indicator information may be provided to the client device via the manifest file, it provides for selectively providing this service, i.e. wherein client devices are instructed to request delivery path information and/or network elements are instructed to provide said delivery path information.

For example, this service may only be provided as a premium service, associated with certain content or certain subscriptions. Or it may only be provided during periods of network mal performance, when the (content delivery) networks are not performing optimally. In latter case, a manifest file update with indicator information may be provided relatively quickly to client devices.

Furthermore, when the service provider knows that the content is only available from 1 delivery server, providing this service may not be beneficial and may only increase the processing load on the network elements. Therefore, it may be advantageous to only provide this service when it is know that the content is available from more than 1 location. The chunks referenced by the chunk identifiers may be stored on network elements and may be retrieved by the client device via delivery paths between the client device and said network elements. Each delivery path may comprise an access network, with which the client device may be connected to another or a core network. A client device may be connected with one or more core networks via one or more access networks. Therefore, a specific chunk may be retrievable via two or more different access network. Or two chunks, belonging to the same representation and/or with the same quality, may be stored on different network elements and may be retrievable via two or more different access network.

It may advantageous to provide information about the access network that may be used to retrieve a specific chunk. For example, a content provider may only allow a client device to retrieve a specific content item or to transmit further request, when the client device is connected via a specific access network, for example a specific mobile 3G network operator or a specific DSL operator.

An access network identifier may be provided and arranged for indicated an access network. The access network identifier may be associated with a chunk identifier or with a base URL. Each of these associations may define a delivery path and thus link one or more access networks to one or more delivery paths and/or chunks.

Sending a further request over a delivery path may considered as probing said delivery path in order to obtain information about, for example, the available chunks on said delivery path and/or the bandwidth conditions. A probe priority indicator may be associated with one or more chunk identifiers and may indicate a (probing) order. On the basis of the probe priority indicator it may be decided whether and when a further request is to be sent towards the chunk that the chunk identifier is referencing.

It may advantageous to provide such a probe priority indicator, in order to limit or minimize the number of further request.

According to an embodiment of the non-transitory computer-readable storage medium according the invention, the manifest file comprises at least one of:
- a requesting frequency, indicating a frequency for transmitting said further request;
- one or more buffer thresholds, wherein said further request is only transmitted when a buffer of said client device drops below said one or more buffer thresholds.

According to a fifth aspect of the invention a client device is provided for selecting a chunk identifier referencing a chunk associated with a content item, on the basis of a manifest file, said content item being provided in one or more representations, each representation comprising a plurality of time-sequential chunks, each chunk preferably being associated with a play-out time, said manifest file comprising at least a first set of chunk identifiers referencing chunks of a first representation, and a second set of chunk identifiers referencing chunks of a second representation; chunks of said first representation being retrievable by said client device via a first delivery path and chunks of said second representation being retrievable by said client device via a second delivery path, said client device being arranged for:
- transmitting, preferably over said first delivery path, on the basis of said manifest file, a first chunk retrieval request for retrieving a first chunk of said first representation, said request comprising a chunk identifier of said first set;
- transmitting, preferably over said second delivery path, on the basis of said manifest file, a further request comprising a chunk identifier, preferably of said second set;
- receiving delivery path information in response to said further request or said first chunk retrieval request, said information associated with said first or second delivery path;
- selecting, at least on the basis of said received delivery path information, a chunk identifier, preferably from either said first or second set, for including in a second chunk retrieval request for retrieving a second chunk.

According to an embodiment of the client device according the invention, said first and/or said second chunk retrieval request comprises an HTTP GET request; and/or wherein said further request comprises an HTTP HEAD request; and/or wherein said delivery path information is embedded in an HTTP response message, preferably an HTTP 200 OK, an HTTP 30X Redirect or an HTTP 40X ERROR message.

According to an embodiment of the client device according the invention, said first and second representation relate to different representations of said content item, in particular to representations having a different quality, and more particular to representation with a different rendering bitrate.

According to an embodiment of the client device according the invention, wherein a play-out time associated with said second chunk is earlier than, later than, or equal to a play-out associated with said first chunk.

According to an embodiment of the client device according the invention, said further request is transmitted prior to said first chunk retrieval request.

According to an embodiment of the client device according the invention, the client device is arranged for connecting to a content delivery network, wherein said network comprises network elements. Said chunks belonging to the first or the second representation may be stored on one or more of said network elements. The network elements may comprise transparent network elements and non-transparent network elements, wherein said requests and said further request are addressed only to said non-transparent network elements. The delivery path information is preferably provided by transparent network elements.

According to an embodiment of the client device according the invention, the client device is further arranged for determining a first bandwidth indicator indicating a first (available) bandwidth between a network element storing a chunk of the first representation and said client device.

According to an embodiment of the client device according the invention, said delivery path information comprises a second bandwidth indicator indicating a second (available) bandwidth between a network element storing a chunk of the second representation and said client device.

According to an embodiment of the client device according the invention, the selected chunk identifier, (i.e. the chunk identifier which was selected at least on the basis of said received delivery path information), references a chunk of said second representation, when:
- said second representation has a higher quality than said first representation; and, optionally,
- said second bandwidth enables the play-out of said chunk of said second representation.

According to an embodiment of the client device according the invention, the selected chunk identifier references a chunk of said second representation, when:
- said second representation has a quality equal to, or lower than, the quality of said first representation;
- said second bandwidth is larger than said first band-width; and, optionally,
- said second bandwidth enables the play-out of said chunk of said second representation.

According to an embodiment of the client device according the invention, said first and/or second chunk are retrievable from (network elements in) a content delivery network, said client device arranged for connecting to said content delivery network via a first access network and via a second access network and wherein said first delivery path is associated with the first access network and the second delivery path with the second access network.

According to an embodiment of the client device according the invention, said delivery path information comprises at least one of:
- a chunk identifier, referencing a chunk of said second representation or said first representation;
- a bandwidth indicator, preferably indicating the (available) bandwidth between said client device and a network element storing said chunk;
- a chunk enhancement indicator, indicating chunks comprising content enhancements;
- a lifetime indicator, indicating a period the delivery path information is assumed to be valid.

According to an embodiment of the client device according the invention, said manifest file and/or said client device comprises at least one of:
- a requesting flag, wherein said further request is only transmitted when said requesting flag is set;
- a requesting frequency, indicating a frequency for transmitting said further request;
- one or more buffer thresholds, wherein said further request is only transmitted when a buffer of said client device drops below said one or more buffer thresholds.

According to an embodiment of the client device according the invention, transmitting said further request and/or said first chunk retrieval request is triggered by a predefined event, the predefined event being for example a buffer of said client device being below a predefined buffer threshold.

The client device may be arranged for receiving the manifest file in response to transmitting a manifest file request. The client device may be arranged for transmitting said manifest file request based on a manifest file locator, referencing said manifest file. Instead of embedding the token in the manifest file, the token may also be provided with said manifest file locator.

According to an embodiment of the client device according the invention, the client device is further arranged for transmitting an indicator for allowing transmission of delivery path information, in particular a token, said indicator preferably being a cookie in a HTTP cookie header or a token in an URL string. The client device may transmit said indicator by adding said indicator to said first chunk request or said further request (for example as a token in URL string) or by adding a cookie to said first chunk request or said further request, said cookie preferably comprising said token.

According to an embodiment of the client device according the invention, the client device is further arranged for receiving, preferably with the manifest file, indicator information, comprising an indicator for allowing transmission of delivery path information and/or an indicator instruction for instructing said client device to add said indicator to said first chunk retrieval request or said further request.

According to a sixth aspect of the invention, a network element is provided, said network element arranged for forming part of a delivery path for retrieving a chunk associated with a content item by a client device, wherein said network element is arranged for:
  optionally storing said chunk associated with said content item;
  receiving a request, preferably a first chunk retrieval request or a further request, said request comprising a chunk identifier, referencing to said chunk; said further request preferably being a HTTP HEAD request; and,
  transmitting delivery path information towards said client device, wherein said delivery path information is associated with said delivery path, in response to said request.

In general, a network element may be any network element that is arranged for providing or transmitting a chunk, such as delivery servers, transparent caches, routers, etc. The network element may have a transmitting interface towards the client device and may have a receiving interface from the client device.

According to an embodiment of the network element according the invention, the network element is further arranged for transmitting said delivery path information only if, upon verification by said network element, said request comprises an indicator for allowing said transmission; said indicator preferably being a cookie in a HTTP cookie header or a token in an URL string.

According to an embodiment of the network element according the invention, said network element is a transparent network element arranged for forming part of a delivery path between a client device and a non-transparent network element, wherein said request is addressed to said non-transparent network element, and said transparent network element is further arranged for forwarding said request to said non-transparent network element.

According to an embodiment of the network element according the invention, said network element is a non-transparent network element arranged for forming part of a delivery path between a client device and said non-transparent network element, wherein said request is addressed to said non-transparent network element.

According to an embodiment of the network element according the invention, wherein said first chunk retrieval request comprises an HTTP GET request; and/or wherein said further request comprises an HTTP HEAD request; and/or wherein said delivery path information is embedded in an HTTP response message, preferably an HTTP 200 OK, an HTTP 30X Redirect or an HTTP 40X ERROR message.

According to an embodiment of the network element according the invention, said delivery path information comprises at least one of:
  a chunk identifier, referencing a chunk preferably stored on said network element;
  a bandwidth indicator, preferably indicating the (available) bandwidth between said client device and said network element;
  a chunk enhancement indicator, indicating chunks comprising content enhancements;
  a lifetime indicator, indicating a period the delivery path information is assumed to be valid.

According to an embodiment of the network element according the invention, the network element is further arranged for receiving a response, said response comprising delivery path information from another network element in said delivery path, and for adding said delivery path information to said response before transmitting said response towards said client device.

It may be the case that the network element and the other network element form part of the same delivery path and that the network element is located closer to said client device than said other network element. Instead of transmitting its delivery path information in a separate response, the network element may arranged for appending or adding its delivery path information to a message comprising delivery path information from other network elements. An advantage of this embodiment is that the number of replies, and thus the amount of network traffic will be lower than when each network element transmits one response to said client device.

According to an embodiment of the network element according the invention, the network element is further arranged for verifying that said further request or said first chunk retrieval request comprises an indicator for allowing transmission of delivery path information.

In an embodiment, the network element is arranged for transmitting said delivery path information only when said further request or said first chunk retrieval request comprises or is provided with an indicator for allowing transmission of delivery path information.

According to an embodiment of the network element according the invention, the network element is further arranged for receiving an indicator and for identifying said client device or said indicator as part of a predetermined list based on said indicator.

The network element may be arranged for transmitting said delivery path information only when said client device or said indicator is part of said list.

According to a seventh aspect of the invention, a system is provided for selecting a chunk identifier referencing a chunk associated with a content item, on the basis of a manifest file, said content item being provided in one or more representations, each representation comprising a plurality of time-sequential chunks, each chunk preferably being associated with a play-out time, said manifest file comprising at least a first set of chunk identifiers referencing chunks of a first representation, and a second set of chunk identifiers referencing chunks of a second representation; chunks of said first representation being retrievable by a client device via a first delivery path and chunks of said second representation being retrievable by said client device via a second delivery path, said system comprising:

network elements according to any one of the embodiments of the network element described in this document;

a client device according to any one of the embodiments of the client device described in this document.

It may be understood that features and advantages of embodiments of the method for selecting a chunk identifier as described in this document are also applicable to the embodiments of the computer readable storage medium, the computer program product, the non-transitory computer readable storage medium, the client device, the network element and/or the system for selecting a chunk identifier and vice versa, mutatis mutandis.

The various aspects and features described and shown in the specification can be applied, individually, wherever possible.

BRIEF DESCRIPTION OF THE DRAWINGS

The invention will be elucidated on the basis of an exemplary embodiment shown in the attached figures, in which.

DETAILED DESCRIPTION

In video streaming technologies, parts of a content item may be transferred towards a client device, which may comprise a streaming client, arranged for playing out or rendering said content item. These parts may be referred to as chunks, fragments or segments. The content item may be available in different (quality) representations, for example having a play-out bitrate of 2 Mb/s or 4 Mb/s. Chunks of such representations of said content item can therefore said to have a quality of 2 Mb/s or 4 Mb/s. This allows the client device to seamlessly adapt the quality of the play-out (e.g. of a video) from one chunk request to the next, based on current network and client device conditions.

Another characteristic of a representation may be whether the representation comprises content enhancements, for example subtitles or other information that may be displayed or rendered during the play-out. Chunks of such representations can therefore be said to have an enhanced content.

This technology is generally referred to as HTTP Adaptive Streaming. Different implementations of this technology are Microsoft Smooth Streaming, Apple HTTP Live Streaming, and Dynamic Adaptive Streaming over HTTP (DASH).

The location (usually in the form of a URL) from which every chunk can be retrieved by the client device is stored in a manifest file. In the DASH standard, this file is also referred to as the Media Presentation Description (MPD).

At the start of a streaming session of a content item, the client device may requests the manifest file, in order to determine the availability of different representations of the content item, the (play-out) bitrates of these representations, the number of chunks and/or their locations.

After receiving the manifest file, the client device may be arranged to determine which chunk (and thus which quality) it will request/retrieve based on an adaptation algorithm of the client device.

Figure 1:
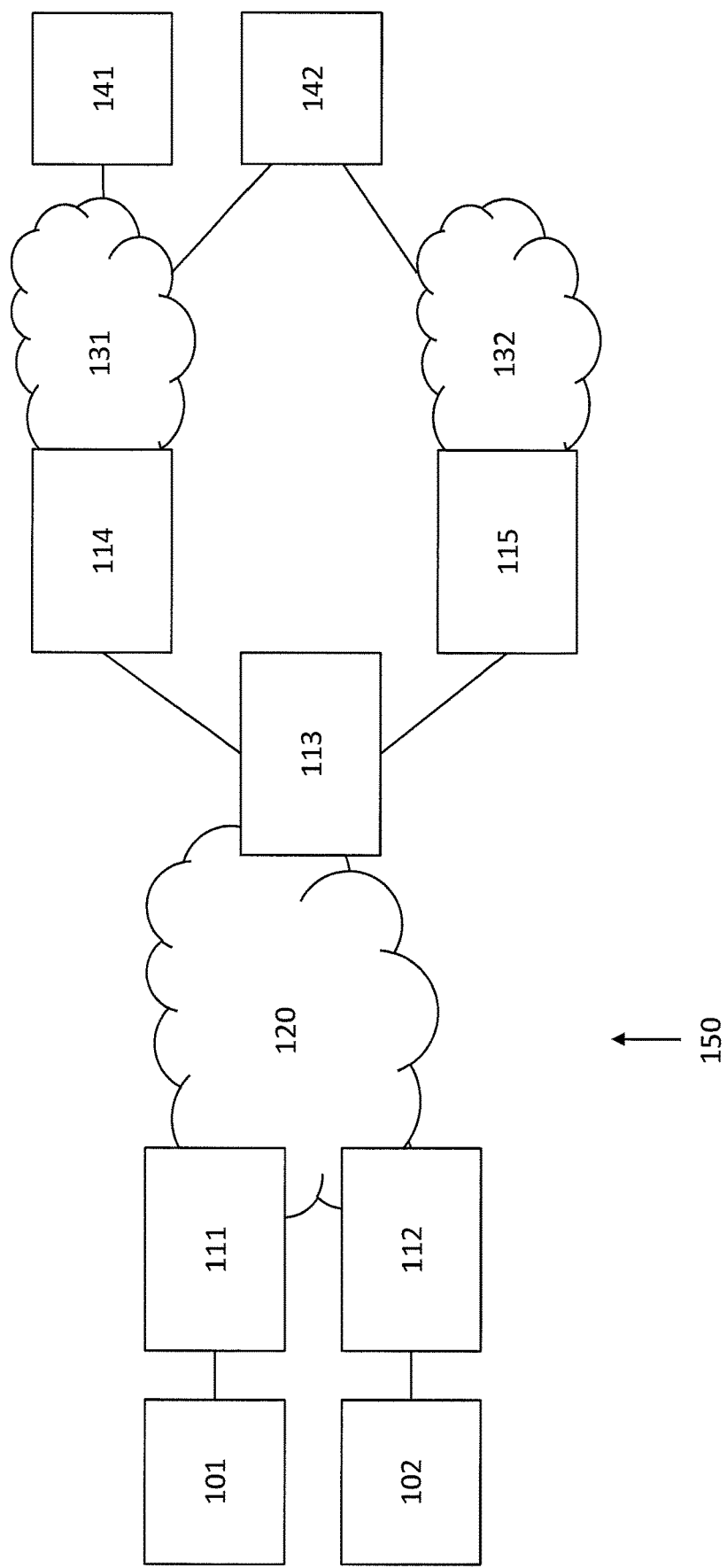
FIG. 1 shows a network topology with client devices and network elements according to one or more embodiments according to the invention.

FIG. 1 shows a schematic overview of two client devices 141, 142 connected to a content delivery network 150. The content delivery network may comprise network elements, which may be divided in transparent and non-transparent network elements. Delivery servers 101 and 102 are examples of non-transparent network elements, while (transparent) caches 111, 112, 113, and 114 are examples of transparent network elements. The network elements may be connected to each other via a communications network, which may comprise a backbone network 120. The client devices 141 and 142 may be connected to network elements via access networks 131, 132.

The caches may be HTTP caches and may comprise a memory for storing HTTP content, which may be a RAM memory, a hard disk or a combination thereof. The caches may be arranged for receiving or intercepting (HTTP) requests (from a client device) and responses (from other network elements such a delivery server). These responses may comprise chunks and/or delivery path information.

Using the intercepted responses the cache may be arranged to determine whether or not the chunks, embedded in the responses, should be cached, using its cache retention policy. This policy is usually based on a measure of content popularity (e.g., least recently used or least frequently used).

Client device 142 is connected to delivery server 101 via a first delivery path, using access network 131, comprising caches 114, 113 and 111. Client device 142 is also connected to delivery server 101 via a second delivery path, using access network 132, comprising caches 115, 113 and 111.

When a (HTTP) request, transmitted for example by client device 142 for retrieving a specific chunk from delivery server 102, is intercepted by a cache 113, the cache 113 may determine whether the requested chunk is stored on said cache. If so, the chunk is directly provided by the cache 113 and transmitted to the client device 142. If not, the request is forwarded by the cache 113 to the next network element on the delivery path towards the delivery server, which is in this case cache 112.

The caches of FIG. 1 may comprise a set of zero or more chunks. These chunks may be identified by a chunk identifier, which may comprise a sequence number and a quality identifier. The sequence number identifies the chunk's position within the time sequence of the content item. The quality identifier identifies the (quality) representation to which the chunk belongs. One or multiple servers may host a specific chunk.

The chunk identifiers, comprising or being provided with the location of each identified chunk, may be provided to the client device in the manifest file. The client device may use an adaptation algorithm to determine on the basis of the manifest file which chunk to retrieve, i.e. which chunk identifier the client device may include in the chunk request and to which delivery server the client the chunk request will transmit.

In FIG. 1, according to a first scenario, the client device 141 may have received a manifest file. It may have retrieved a first chunk and the manifest file may indicate that the next chunk, that the client device requires, is stored twice on delivery server 101, a chunk belonging to a first representation and a chunk belonging to a second representation.

The second representation may have a higher quality, for example having a bit rate of 4 Mb/s, while the first representation has a bit rate of 2 Mb/s.

It may appear that the end-to-end bandwidth between the first delivery server 101 and the client device 141 is too small to retrieve the chunk of 4 Mb/s, for example because of network congestion between delivery server 101 and cache 111. The client device may then decide to request the chunk with a bit rate of 2 Mb/s. However, it may the case that the chunk with bitrate of 4 Mb/s is also available on cache 114, while the bandwidth between cache 114 and client device 141 is more than enough to retrieve the chunk with a bit rate of 4 Mb/s from cache 114.

When the adaption algorithm can only use the end-to-end bitrates between delivery servers and the client device, as is illustrated above, the client device may not have enough information enabling the client to retrieve the chunk belonging to the representation with the highest available quality, and the play-out of the content item by the client device may be sub-optimal.

This situation may be improved when the client device has information about the chunks that the caches store and the available bandwidth between the caches and the client device. Information about the available chunks on caches in a delivery path between the client device and a delivery server may be referred to as delivery path information.

According to the invention, a first chunk retrieval request may be transmitted, preferably by the client device 141 over a first delivery path (141-114-113-111-101) for retrieving said first chunk. In response to said first chunk request, delivery path information associated with said first delivery path may be transmitted, for example by cache 141, and preferably to client device 141. The first chunk retrieval request may be received by the delivery server 101 and may transmit a response thereto comprising said first chunk. The cache 114 or any other cache may be arranged for intercepting said response, or any other response from a delivery server, and for appending delivery path information to the response and transmitting it to the client device 141.

In this way, the client device may receive information that the second chunk is not only available on the delivery server 101 but also on the cache 114. The client device may further have information about the available end-to-end bandwidth between the delivery server 101 and the client device 141 and between the cache 114 and the client device 141.

Based on this information, the client device may transmit a second chunk retrieval request for retrieval of a second chunk, to delivery sever 101, the second chunk being the chunk with a bit rate of 4 Mb/s. This request may be intercepted by the cache 141. The chunk with a bit rate of 4 Mb/s may then be provided to the client device by the cache 141 instead of by the delivery server 101, without any effect of the network congestion between delivery server 101 and cache 111.

Figure 2:
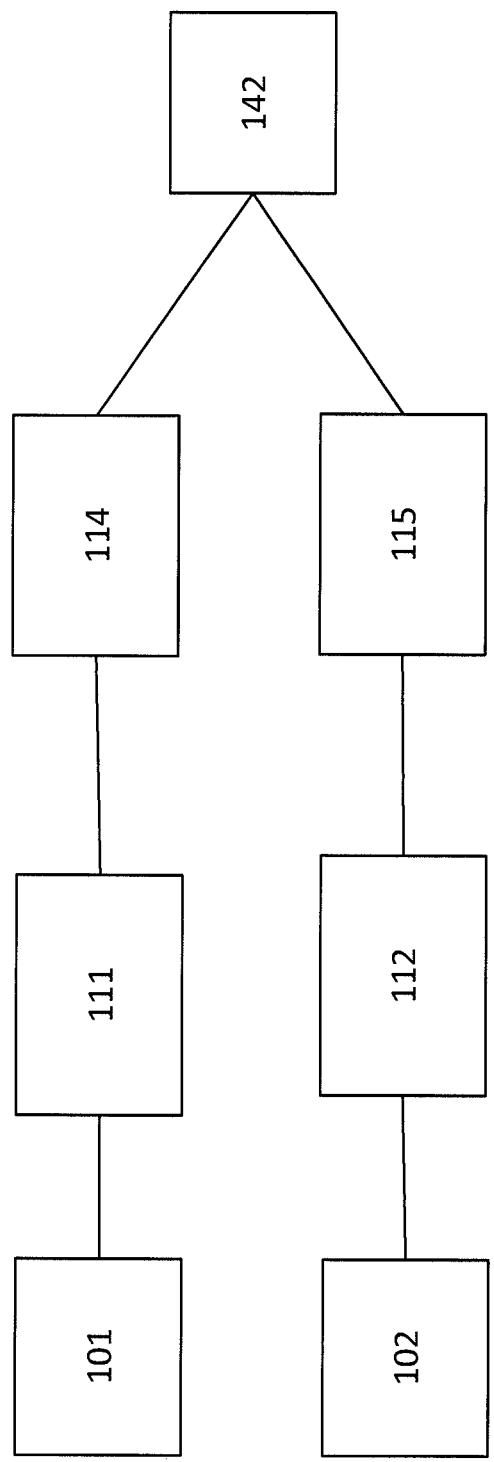
FIG. 2 shows a simplified network topology corresponding with the network topology of FIG. 1.

In FIG. 2 a simplified network topology for client device 142 of FIG. 1 is depicted. In a second scenario the following is assumed: the manifest file indicates that a first and a second chunk are both twice stored on delivery server 101, belonging to a first and second representation, and twice on delivery server 102, also belonging to a first and second representation. A copy of at least the second chunk belonging to the second representation is also stored on cache 115. The first representation has a bit rate of 2 Mb/s and the second representation has a bit rate of 4 Mb/s.

In this scenario, the timely retrieval of any of chunks from delivery server 102 is not possible, for example when the available bandwidth between cache 112 and cache 115 is too small, for example 1 Mb/s. Furthermore, the chunk of the second representation on delivery server 101 cannot be timely retrieved, for example because the available bandwidth between cache 111 and cache 114 is limited, for example to 3 Mb/s.

Based only on the manifest file, the client device 142 requests a first chunk belonging to the first representation, that is stored in delivery server 101.

Therefore, the client device will transmit a first chunk retrieval request to delivery server 101. In response to said request (or to the response from the delivery server 101), the cache 111 and/or 114 may transmit delivery path information that is associated with the first delivery path, the first delivery path being in this case 142-114-111-101. However, this delivery path information will not comprise information indicating the availability of a second chunk with a bit rate of 4 Mb/s on cache 115, since this cache is not part of the first delivery path.

Since cache 115 is not part of the first delivery path, it cannot intercept any messages, request and/or responses between the client device 142 and the delivery server 101. Therefore, cache 115 will not be triggered by these messages, requests and/or responses to transmit delivery path information.

According to the invention, a further request is transmitted over a second delivery path. Based on the manifest file, the client device is aware of chunks being available on the second delivery server 102, i.e. a first chunk belonging to the first representation, a second chunk belonging to the first representation, a first chunk belonging to the second representation and a second chunk belonging to the second representation. Using a chunk identifier referencing any one of the chunks available on the second delivery server 102, the client device may transmit the further request to the second delivery server 102 over a second delivery path, in this case 142-115-112-102.

In response to this further request, the delivery server 102, cache 112, and/or cache 115 may transmit delivery path information, associated to the second delivery path, preferably to the client device 142. The caches may transmit their delivery path information separately or append it to the response given by the delivery server 102.

The delivery path information from cache 115 will indicate that a second chunk belonging to the second representation is available on cache 115. Furthermore, said chunk can be timely retrieved.

Therefore, the client device may select a chunk identifier referencing said second chunk belonging to the second representation and transmit a second chunk retrieval request, preferably comprising said chunk identifier, to the second delivery server 102 over the second delivery path in order to retrieve said second chunk. This second chunk retrieval request may then be intercepted by cache 115 and the second chunk belonging to the second representation will be timely provided by cache 115 (and not by the second delivery server 102).

Thus, delivery path information may also be transmitted, preferably to the client device, that is associated with a delivery path (i.e. the second delivery path), that is not used for the retrieval of chunks (i.e. the first delivery path). This especially advantageous when the client device is connected to one or more delivery servers and/or is connected via two different access networks, for example a Wi-Fi access network and a 3G/4G access network.

It may advantageous to provide information, preferably to the client device, which access network is part of which delivery path. For example, it may be the case that some services are only available to a client device, when the client device is connected to a specific access network. Or it may be advantageous to transmit further request using one or more specific access network or all available access networks.

The information indicating which access network is part of which delivery path may be provided with the chunk identifier, preferably in the manifest file. The chunk identifier references a chunk and thus a delivery path from the client device to the network element storing said chunk.

Alternatively, the information indicating which access network is part of which delivery path may be provided by associating a base URL (or any other information identifying the network element on which chunks are stored) with one or more access networks, preferably in the manifest file.

As an example of the latter, such a manifest file, in particular a MPEG DASH MPD file, may comprise the following:

```
<AccessNetwork id="HomeWiFi">IEEE802.11:SSID:ProviderHome
    </AccessNetwork>
<AccessNetwork id="LTE">LTE:ProviderName
    </AccessNetwork>
<BaseURL id="HomeWiFi;LTE">http://www.example.com/
    </BaseURL>
<BaseURL id="HomeWiFi">http://www.homeonlyserver.com/
    </BaseURL>
```

In general, the first and/or second chunk retrieval request may be a HTTP GET message. The further request may be a HTTP HEAD message.

When the client device is using HTTP Adaptive Streaming to receive chunks, the client device may use a HTTP GET request for retrieving a first chunk and a HTTP HEAD request as a further request. Network elements may be arranged for responding to a further request, such as HTTP HEAD, with said delivery path network information. When the first chunk retrieval request is further arranged for retrieving delivery path information, said network elements may be arranged for responding to said first chunk retrieval request, such as HTTP GET, with said delivery path information.

Figure 3:
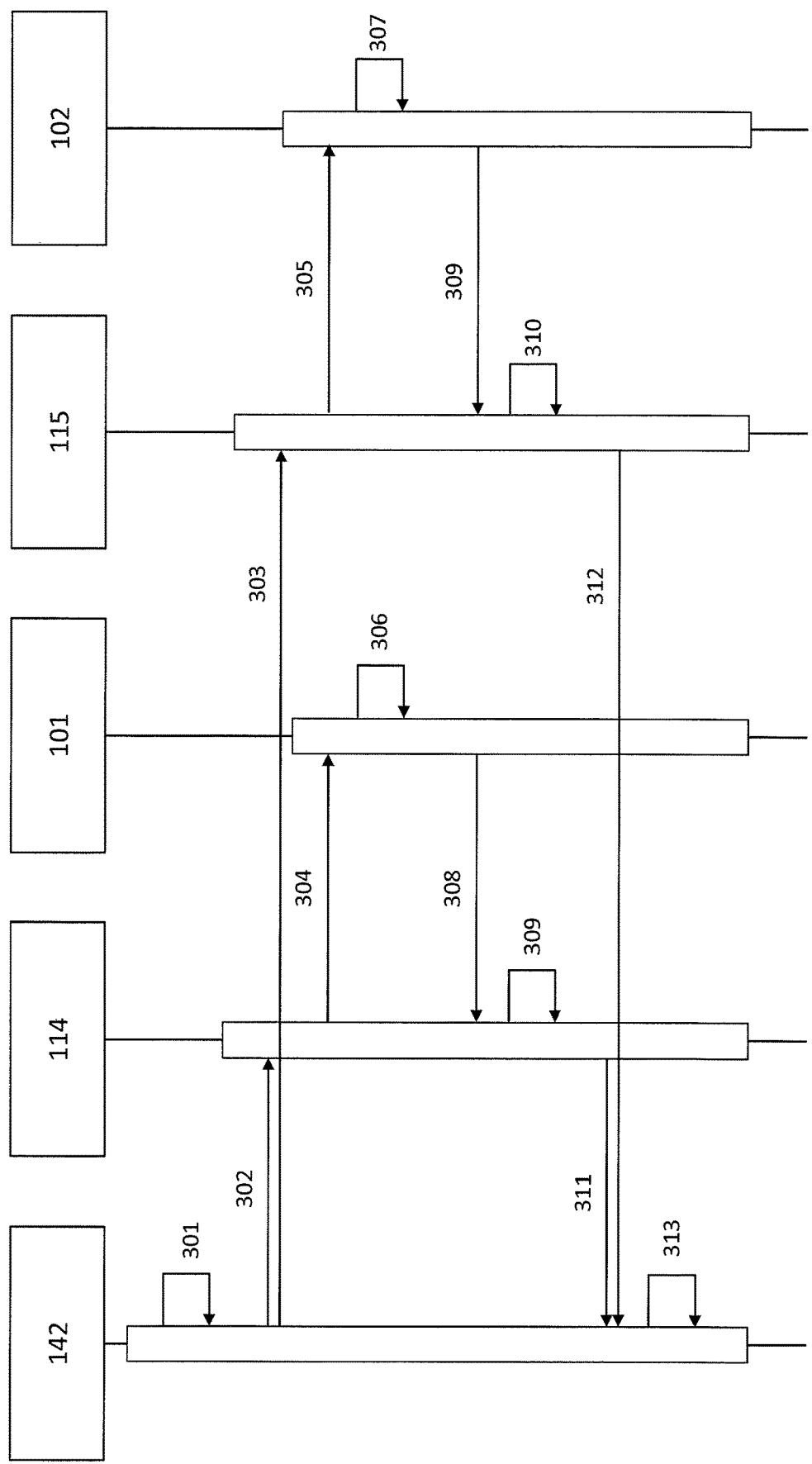
FIG. 3 shows steps of one or more embodiments of the method according to the invention.

Some of the above steps are illustrated by FIG. 3, wherein caches 111 and 112 are omitted for clarity reasons. In step 301 the client device 142 selects the chunk it wants to retrieve. Then it transmits a HTTP GET message, the first chunk retrieval request, towards the first delivery server 101, which is intercepted by cache 114 at step 302. The HTTP GET message is then forwarded to the first delivery server 101 at step 304. The first delivery server 101 may append delivery path information to its response to the HTTP GET message at step 306, before it transmits the response towards the client device 142. This response is intercepted by cache 114. The cache appends their delivery path information to the response at step 309 and forwards it to the client device 142 at step 311.

The client device 142 also transmits a HTTP HEAD message, the further request, to the second delivery server 102. This HTTP HEAD message is intercepted by cache 115 at step 303 and forwarded to the second delivery server 102 at step 305. The second delivery server 102 may append its delivery path information to its response to the HTTP HEAD message at step 307 and transmit the response towards the client device 142 at step 309. This response is intercepted by cache 115, which may append its delivery path information to the response in step 310 and transmit the response to the client device 142 in step 312. The client device processes the received delivery path information at step 313.

An example of delivery path information that may be added by a delivery server to a response to an HTTP GET or HTTP HEAD message is:

<<Server-Achievable-Throughput: 1500 Kbps

An example of delivery path information that may be added by a cache to that response is:

<<Cache-Achievable-Throughput: 3500 Kbps
<<Cached-Chunk: <Chunk Identifier for Second Chunk Second Representation>

Information about changes in the location of chunks on delivery servers is provided to the client device in the manifest file updates.

In an embodiment, for each chunk retrieval request that is transmitted over a first delivery path, a further request is transmitted over all other delivery paths. And for each further request at least one response may be transmitted. This could introduce overhead in the network.

In general, to limit the number of messages sent, one or more of the following may be applied:

1. The further request may only be transmitted when a buffer of the client device is below a predetermined threshold. This predetermined threshold could be provided to the client device embedded in the manifest file.

2. The further request may be transmitted with a predetermined frequency. The associated time-interval could be set equal to the duration of the chunks to optimize the quality. This predetermined frequency could also be provided to the client device embedded in the manifest file.

3. The further request may be a HTTP HEAD message. To prevent network elements from sending delivery path information in response to every message that is requesting delivery path information (such as a HTTP HEAD message or a HTTP GET message), a flag could be added to the message. Network elements may be arranged for transmitting delivery path information only when this flag is set TRUE.

4. The further request may be transmitted on the basis of a probe priority indicator. Probe priority indicators may be provided in the manifest file and may be associated with respective chunk identifiers and thus with respective chunks. The probe priority indicators may indicate to which of the chunks a further request is transmitted first, second, etc.

The probe priority indicators may indicate an order of preference or a mandatory order. In the first case, the client device may use the order indicated by the probe priority indicators, in the latter case, the client device has to (is required to) use the order by the probe priority indicators when transmitting further request.

For example, the probe priority indicator may be a number. The number 0 may indicate that the client device may or must transmit always a further request to this chunk. The number 1 may indicate that the client device may or must transmit only a further request, when the delivery path information, received in response to further request(s) transmitted to chunks with an associated probe priority indicator of 0, is not fulfilling a predetermined requirement. The number 2 may indicate that the client device may or must transmit only a further request, when the delivery path information, received in response to further request(s) transmitted to chunks with an associated probe priority indicator of 1, is not fulfilling a predetermined requirement.

Such predetermined requirement may be that the delivery path information comprises information that a certain chunk belonging to a representation with a certain quality is available and, optionally, the available bandwidth is sufficient to retrieve it.

Another example of a predetermined requirement is that the delivery path information comprises information that a certain chunk is retrievable, the available bandwidth is sufficient and/or that certain chunk belongs to a representation with a quality that is (i) better than the quality of the representation to which the chunk(s) belong that is/are currently being retrieved or (ii) is the highest quality that is available at all. In another scenario, illustrated in FIG. 4, a transparent network element, such as a cache, may be arranged for receiving a first chunk retrieval request for retrieving a first chunk (as described in this document), preferably from the client device, for transmitting said first chunk towards the client device and for transmitting a further request (as described in this document) towards the delivery server. The transparent network element may be arranged for receiving a response, comprising delivery path information and/or a chunk and transmitted by another network element in response to said further request (as described in this document). The transparent network element may be arranged for appending its delivery path information in said response or for transmitting said delivery path information separately.

Figure 4:
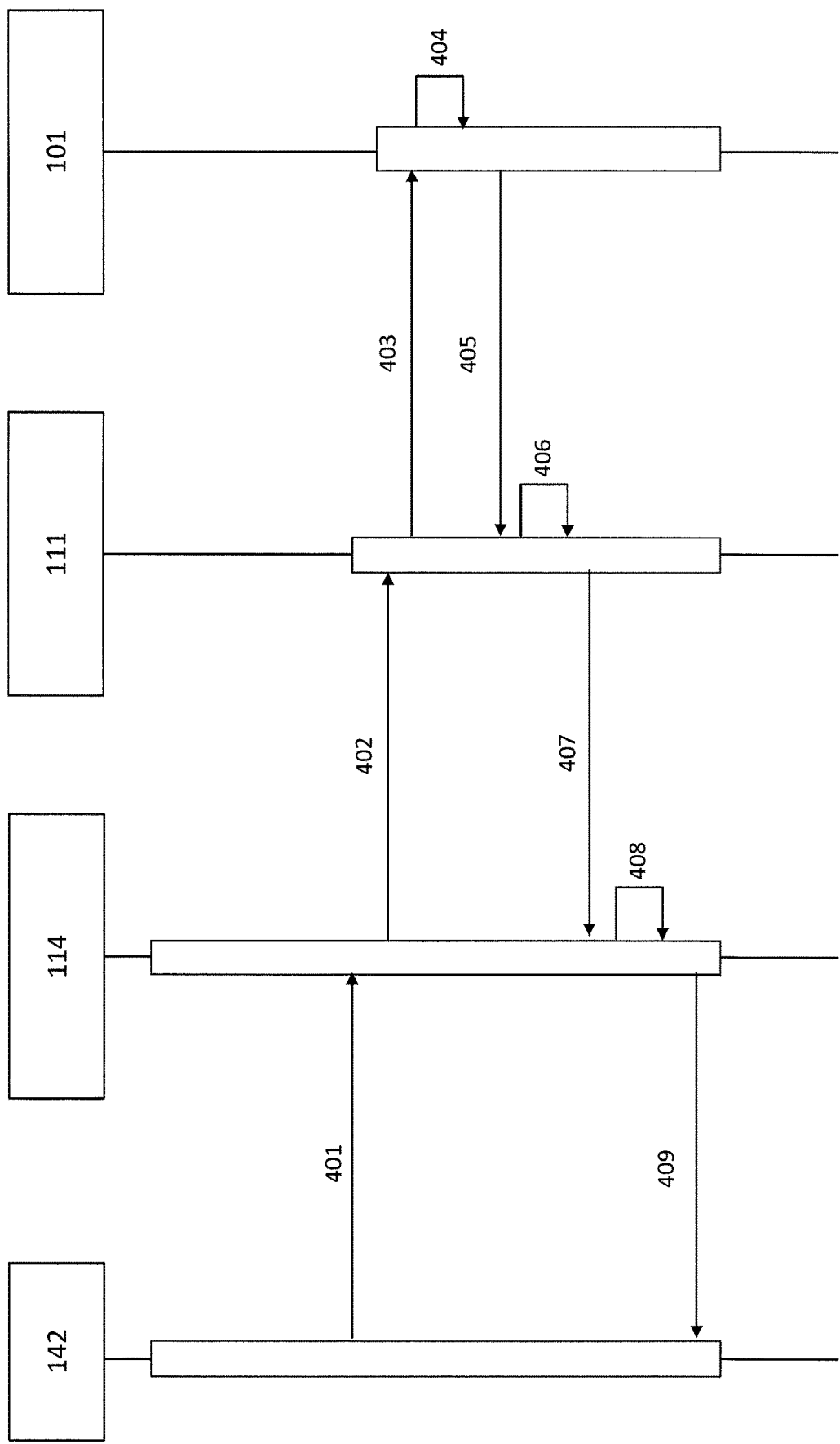
FIG. 4 shows steps of one or more embodiments of the method according to the invention; and, FIG. 5 shows steps of one or more embodiments of the method according to the invention.

In step 401 of FIG. 4 the client device 142 transmits a first chunk retrieval request, e.g. an HTTP GET message, towards the first delivery server 101. The first chunk retrieval request is intercepted by cache 114 and, because the cache is storing the chunk the first chunk retrieval request is referring to, the cache provides the chunk to the client device in step 409. Furthermore, in response to said first chunk retrieval request, the cache transmits a further request, e.g. a HTTP HEAD message, towards the first delivery server 101. Cache 111 intercepts this further request and forwards it to the first delivery server 101. The first delivery server 101 receives the further request and may add its delivery path information to its response to the further request in step 404. The response with the delivery path information is transmitted towards the client device. The response is intercepted by cache 111. In response to the further request the cache 111 transmits delivery path information towards the client device in step 407, either by adding it to said response or by transmitting it separately. The delivery path information may also be added to response to another, preferably later, request from the client device. Cache 114 intercepts said response and may add its delivery path information in step 408. Cache 114 may transmit all the delivery path information in a separate message or included in the message comprising the chunk.

The further request may also be transmitted by the client device instead of by the cache 114, preferably together with the first chunk retrieval request.

An advantage of this scenario is that the client device may receive delivery path information associated with the (first) delivery path from network element(s) (cache 111 in FIG. 4) in the (first) delivery path, that do not receive its (first) chunk retrieval request, because this request is served by a network element (cache 114 in FIG. 4) that is closer to the client device on the (first) delivery path than said network element(s).

In general, a streaming service provider may provide different services to different client devices (or client device sessions from a single client device). An indicator can be used to identify the entitlements of different client devices or different client device sessions, in particular which of these are allowed to use/receive delivery path information provided by the network elements, e.g. an indicator for allowing transmission of delivery path information. The indicator may be a cookie in a HTTP cookie header or a token in an URL string. The indicator may be transmitted with a request, such as a further request, a first or second chunk retrieval request, etc.

The indicator may be provided to the client device comprised in indicator information, wherein the indicator information may further comprise an indicator instructor for instruction the client device to add said indicator to requests, such as the further request and the first chunk retrieval request.

For example, a premium customer using client device A may be entitled to get the best available play-out and therefore client device A may be entitled to receive delivery path information. Furthermore, client device B, belonging to a standard customer, may not be entitled to receive delivery path information. An indicator or in particular a token can thus be used to identify the entitlements of different client devices. A network element, such as a cache, may receive the indicator or token, with the further request and may use it to identify the client device. It may be the case that only when a network element has verified that the request (a further request or a first chunk retrieval request) the client has received, comprises (or is provided with) an indicator, the network element will transmit delivery path information. In another embodiment, the indicator may be used for determining whether the client device is on a predetermined list. And only when said client device is on a predetermined list, the network element may decide to transmit delivery path information, in particular to said client device.

Figure 5:
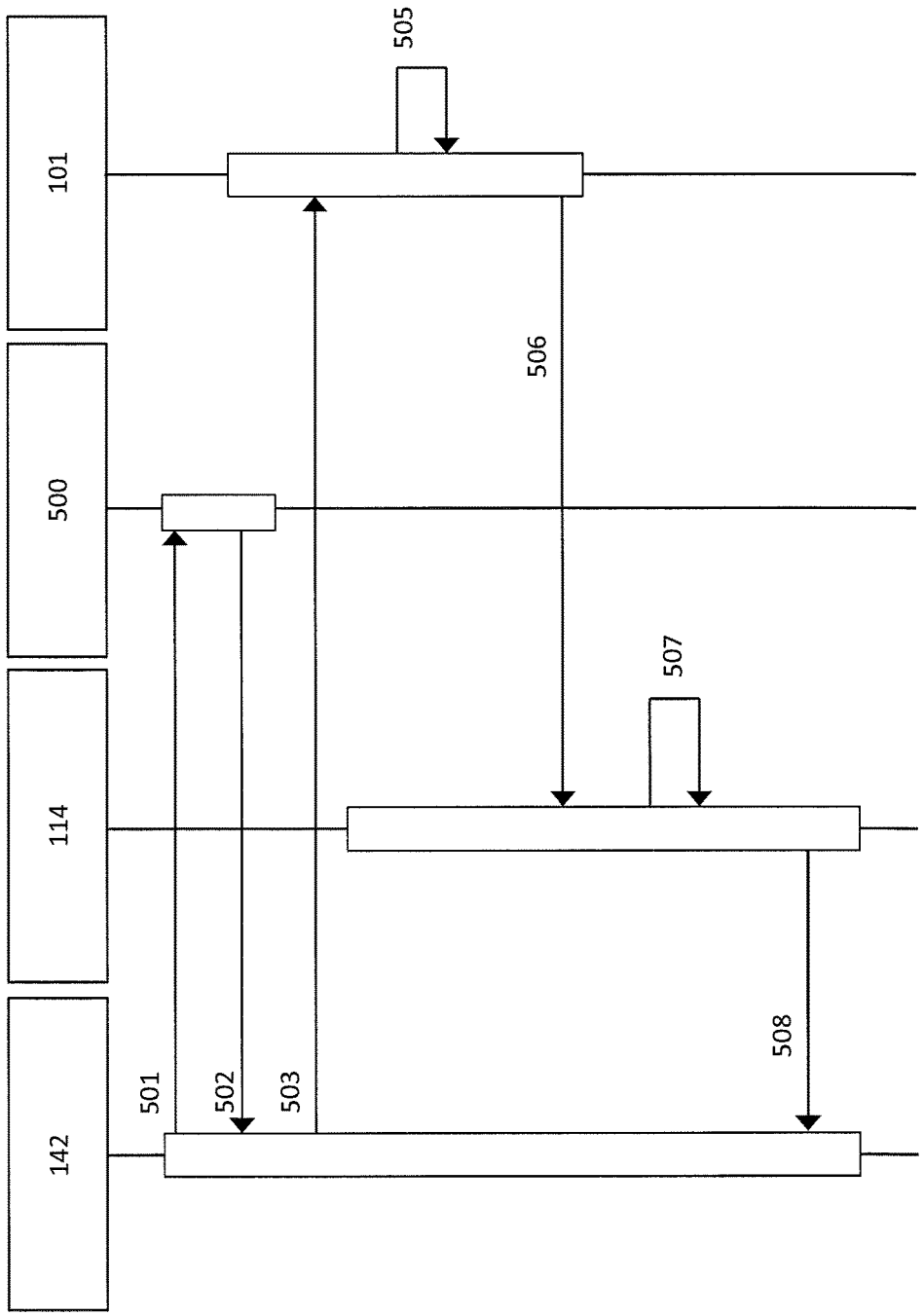

FIG. 5 illustrates a method for such differentiating based on an indicator, in particular so-called cookies comprising a token. In step 501 the client device 142 requests the manifest file from a content server 500, for example with a HTTP GET request:

HTTP GET http://www.contentserver.com/movie/mpd.xml

In response to the request, the content server 500 transmits a response with the manifest file and a so-called cookie. This cookie may be or comprise a unique identifier or token assigned to the client device or client device session. The response transmitted at 502 could for example be:

HTTP RESPONSE 200 mpd.xml

Set-Cookie: token=abcdef wherein the Set-Cookie field name may be part of the HTTP header field.

Now, whenever the client device subsequently transmits an HTTP request (step 503) to a delivery server that falls within the scope of the cookie (as denoted by the Domain value), for example delivery server 101, then the client device adds the cookie key and value to this request (e.g., as an HTTP header field), for example in the form of:

HTTP GET http:// . . . /chunk_N_Xkbps.mp4 Cookie: token=abcdef;

The delivery server 101 can subsequently check if the client device is entitled to receive delivery path information, based on the cookie key and value pair found under the "Cookie" HTTP header field. If so, the information is added to the response (step 505).

When the response is transmitted towards the client device (step 506), the cookie is once again added to it, for example as:

HTTP RESPONSE 200 chunk_N_Xkbps.mp4

Set-Cookie:token=abcdef

The response may be intercepted by cache 114. If an intermediary cache, such as cache 114, wants to check the cookie, it will instead need to check the "Set-Cookie" header field, rather than the "Cookie" header field, as it is evaluating a response rather than a request. If the client device is entitled to receive delivery path information, the cache 114 will add its delivery network information to the response in step 507 and transmit the response to the client device in step 508.

As an alternative to using cookies, the indicator, in particular a token or a unique identifier can be added to a URL in the manifest file and/or request. This can also be illustrated by FIG. 5.

The token may be generated by the content server 500 when it generates the web page that links to the manifest file. A dynamic page can be generated for each client device, containing a unique token in the manifest file URL query component.

Then, at step 501, a token is added to the manifest file request, for example in the form of:

HTTP GET http:// . . . /movie/mpd.xml?token=abcdef

The content server may transmit a response (step 503) in the form of:

HTTP RESPONSE 200 mpd.xml

The manifest file may additionally state that the client device should add the query part of the manifest file URL to the URLs of the segments in HTTP GET messages. Subsequently, when the client device transmit a chunk (step 503), the "token=abcdef" string is appended to the segment URL. For example:

GET http:// . . . /chunk_N_Xkbps.mp4?token=abcdef

Subsequently, the delivery server may check the token in the URL query to determine whether client device is entitled to receiving delivery path information. If so, the information is added to the response (see step 505) and transmitted towards the client device.

Since the response does usually not comprise any trace of the token, an intermediary cache (such as cache 114) intercepting said response, cannot use the response to determine whether the client device is entitled to receiving delivery path information. However, to determine this, the intermediary cache may store the token when it intercepts the request or it may check whether delivery path information was already added to the response. Another option is that the delivery server adds the token as an HTTP header to the response.

In the above it is explained how an indicator, in particular a token can be used to identify a client device transmitting a chunk retrieval request or HTTP GET message. The same may also be applied to a client device transmitting a further request, HTTP GET or HTTP HEAD message (as described in this document).

In general, all features of cache or a delivery server as described above may also be applied to a transparent network element or a non-transparent network element respectively.

As will be appreciated by one skilled in the art, aspects of the present invention may be embodied as a system, device, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", "system", "device" or "element". Functions described in this document may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a first computer (for example one of: the client device and a network element), partly on the first computer, as a stand-alone software package, partly on the first computer and partly on a second computer (for example another of the client device and a network element). In the latter scenario, the second computer may be connected to the first computer through any type of network, including a local area network (LAN) or a wide area network (WAN), or the connection may be made to an external computer (for example, through the Internet using an Internet Service Provider).

It will be understood that steps and combinations of steps described in this document and/or in the figures can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the acts specified in this document.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in this document. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in this document.

In summary, the invention may be described as relating to a method, a system and a various components of such a system for selecting a chunk identifier in a content delivery network. In said network a first and a second chunk are available, belonging to different quality representations of a content item. A client device transmits a first chunk retrieval request for retrieving a first chunk and a further request. In response to said first chunk retrieval request and/or said further request, delivery path information is transmitted. The delivery path information may comprise chunk identifiers and bandwidth indicators. On the basis of the delivery path information the client device determines a chunk identifier to be included in a second chunk retrieval request for retrieving a second chunk.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

What is claimed is:

1. A method for selecting a chunk identifier referencing a chunk associated with a content item, on the basis of a manifest file, said content item being provided in one or more representations, each representation comprising a plurality of time-sequential chunks, said manifest file comprising at least a first set of chunk identifiers referencing chunks of a first representation, and a second set of chunk identifiers referencing chunks of a second representation; chunks of said first representation being retrievable by a client device via a first delivery path and chunks of said second representation being retrievable by said client device via a second delivery path which is different from the first delivery path, said method comprising:
transmitting by said client device over said first delivery path, on the basis of said manifest file, a first chunk retrieval request for retrieving a first chunk of said first representation, said request comprising a first chunk identifier of said first set;
transmitting by said client device over said second delivery path, on the basis of said manifest file, a further request comprising a second chunk identifier of said second set, said second chunk identifier referencing a second chunk;
receiving by said client device a response message comprising delivery path information in response to said further request, wherein said response message does not comprise said second chunk or part thereof and wherein said delivery path information comprises at least one of:
(a) a chunk identifier, referencing a chunk of said second representation currently stored on a network element, said network element being part of said second delivery path;
(b) a bandwidth indicator, indicating available bandwidth between said client device and a network element storing said chunk;
(c) a chunk enhancement indicator, indicating chunks comprising content enhancements; and
(d) a lifetime indicator, indicating a period the delivery path information is assumed to be valid; and
selecting by said client device, at least on the basis of said received delivery path information, a chunk identifier, from either said first or second set, for including in a second chunk retrieval request for retrieving a second chunk.

2. The method according to claim 1, wherein said first and/or said second chunk retrieval request comprises an HTTP GET request; and/or wherein said further request comprises an HTTP HEAD request; and/or wherein said delivery path information is embedded in an HTTP response message.

3. The method according to claim 1, wherein said second delivery path comprises at least a non-transparent network element and a transparent network element, said further request being addressed to said non-transparent network element and said delivery path information being provided by said transparent network element.

4. The method according to claim 1, wherein said first and second chunks are retrievable from a content delivery network, said client device being connected to said one or more content delivery networks via a first access network and via a second access network and wherein said first delivery path is associated with the first access network and the second delivery path with the second access network.

5. The method according to claim 1, wherein transmitting said further request and/or said first chunk retrieval request is triggered by a predefined event, the predefined event being a buffer of said client device being below a predefined buffer threshold.

6. The method according to claim 1, further comprising transmitting said delivery path information in response to said further request, based on an indicator for allowing said transmission, wherein said indicator is a cookie in a HTTP cookie header or a token in an URL string.

7. The method according to claim 6, wherein said delivery path information is only transmitted after verifying that said further request comprises or is provided with said indicator.

8. A computer program product comprising software code portions configured for, when run in the memory of a computer, executing the method steps according to claim 1.

9. A client device for selecting, on the basis of a manifest file, a chunk identifier referencing a chunk associated with a content item, said content item being provided in one or more representations, each representation comprising a plurality of time-sequential chunks, said manifest file comprising at least a first set of chunk identifiers referencing chunks of a first representation, and a second set of chunk identifiers referencing chunks of a second representation; chunks of said first representation being retrievable by said client device via a first delivery path and chunks of said second representation being retrievable by said client device via a second delivery path which is different from the first delivery path, said client device comprising a processor arranged for:
transmitting over said first delivery path, on the basis of said manifest file, a first chunk retrieval request for retrieving a first chunk of said first representation, said request comprising a first chunk identifier of said first set;
transmitting over said second delivery path, on the basis of said manifest file, a further request comprising a second chunk identifier of said second set, said second chunk identifier referencing a second chunk;

receiving a response message comprising delivery path information in response to said further request or said first chunk retrieval request, wherein said response message does not comprise said second chunk or part thereof and wherein said delivery path information comprises at least one of:
- (a) a chunk identifier, referencing a chunk of said second representation currently stored on a network element, said network element being part of said second delivery path;
- (b) a bandwidth indicator, indicating available bandwidth between said client device and a network element storing said chunk;
- (c) a chunk enhancement indicator, indicating chunks comprising content enhancements; and
- (d) a lifetime indicator, indicating a period the delivery path information is assumed to be valid; and selecting, at least on the basis of said received delivery path information, a chunk identifier from either said first or second set, for including in a second chunk retrieval request for retrieving a second chunk.

10. A non-transitory computer readable storage medium for storing at least part of a manifest file for use by a client device according to claim 9, said manifest file comprising:
one or more chunk identifiers for enabling said client device to generate a chunk retrieval request or a further request for delivery path information;
and, at least one of:
indicator information for adding an indicator to said first chunk request or said further request, wherein indicator information comprises an indicator for allowing transmission of delivery path information to said client device and/or an indicator instruction for instructing said client device to add said indicator to said request;
an access network identifier associated with said one or more chunk identifiers, said identifier being arranged for identifying an access network forming part of a delivery path via which said chunks are retrievable, and optionally causing said client device to connect to said access network for transmission of said further request;
a probe priority indicator associated with said one or more chunk identifiers and arranged for indicating an order of transmitting further request.

11. The client device according to claim 9, wherein said first and/or said second chunk retrieval request comprises an HTTP GET request; and/or wherein said further request comprises an HTTP HEAD request; and/or wherein said delivery path information is embedded in an HTTP response message.

12. The client device according to claim 9, wherein said first and second chunks are retrievable from a content delivery network, said client device being connected to said one or more content delivery networks via a first access network and via a second access network and wherein said first delivery path is associated with the first access network and the second delivery path with the second access network.

13. The client device according to claim 9, wherein transmitting said further request and/or said first chunk retrieval request is triggered by a predefined event, the predefined event being a buffer of said client device being below a predefined buffer threshold.

14. The client device according to claim 9, wherein said processor is further arranged for transmitting said delivery path information in response to said further request, based on an indicator for allowing said transmission, wherein said indicator is a cookie in a HTTP cookie header or a token in an URL string and said delivery path information is only transmitted after verifying that said further request comprises or is provided with said indicator.

15. A system comprising:
a network element arranged for forming part of a delivery path for retrieving a chunk associated with a content item, wherein said network element comprises a processor arranged for:
optionally storing said chunk associated with said content item;
receiving a request, said request comprising a chunk identifier, referencing said chunk; and,
transmitting delivery path information, wherein said delivery path information is associated with said delivery path, in response to said request; and
a client device for selecting, on the basis of a manifest file, the chunk identifier referencing the chunk associated with the content item, said content item being provided in one or more representations, each representation comprising a plurality of time-sequential chunks, said manifest file comprising at least a first set of chunk identifiers referencing chunks of a first representation, and a second set of chunk identifiers referencing chunks of a second representation; chunks of said first representation being retrievable by said client device via a first delivery path and chunks of said second representation being retrievable by said client device via a second delivery path which is different from the first delivery path, said client device comprising a processor arranged for:
transmitting over said first delivery path, on the basis of said manifest file, a first chunk retrieval request for retrieving a first chunk of said first representation, said request comprising a first chunk identifier of said first set;
transmitting over said second delivery path, on the basis of said manifest file, a further request comprising a second chunk identifier of said second set, said second chunk identifier referencing a second chunk;
receiving a response message comprising delivery path information, from the network element, in response to said further request or said first chunk retrieval request, wherein said response message does not comprise said second chunk or part thereof and wherein said delivery path information comprises at least one of:
- (a) a chunk identifier, referencing a chunk of said second representation currently stored on a network element, said network element being part of said second delivery path;
- (b) a bandwidth indicator, indicating available bandwidth between said client device and a network element storing said chunk;
- (c) a chunk enhancement indicator, indicating chunks comprising content enhancements; and
- (d) a lifetime indicator, indicating a period the delivery path information is assumed to be valid; and selecting, at least on the basis of said received delivery path information, a chunk identifier from either said first or second set, for including in a second chunk retrieval request for retrieving a second chunk.

* * * * *